United States Patent
Saito et al.

(10) Patent No.: US 10,875,468 B2
(45) Date of Patent: Dec. 29, 2020

(54) IN-VEHICLE MONITORING MODULE AND MONITORING SYSTEM

(71) Applicant: Yazaki Corporation, Tokyo (JP)

(72) Inventors: Masaki Saito, Shizuoka (JP); Shinichi Okamoto, Shizuoka (JP); Koji Ishii, Shizuoka (JP); Yoshiyuki Furuya, Shizuoka (JP); Antony Wambugu Ngahu, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/366,367

(22) Filed: Mar. 27, 2019

(65) Prior Publication Data

US 2019/0299877 A1 Oct. 3, 2019

(30) Foreign Application Priority Data

Mar. 29, 2018 (JP) .................................. 2018-065263

(51) Int. Cl.
| | |
|---|---|
| *B60R 11/02* | (2006.01) |
| *B60R 11/04* | (2006.01) |
| *B60R 25/30* | (2013.01) |
| *B60R 21/015* | (2006.01) |
| *B60R 11/00* | (2006.01) |

(52) U.S. Cl.
CPC ...... *B60R 11/0264* (2013.01); *B60R 11/0235* (2013.01); *B60R 11/04* (2013.01); *B60R 21/015* (2013.01); *B60R 25/305* (2013.01); *B60R 2011/0028* (2013.01); *B60R 2300/50* (2013.01); *B60R 2300/8006* (2013.01)

(58) Field of Classification Search
CPC . B60R 11/0235; B60R 11/0264; B60R 11/04; B60R 2011/0028; B60R 21/015; B60R 2300/50; B60R 2300/8006; B60R 25/305
See application file for complete search history.

(56) References Cited

U.S. PATENT DOCUMENTS

| | | | |
|---|---|---|---|
| 6,278,377 B1 | 8/2001 | DeLine et al. | |
| 9,315,152 B1* | 4/2016 | Maestas | ................ B60R 25/305 |
| 2001/0029416 A1 | 10/2001 | Breed et al. | |

(Continued)

FOREIGN PATENT DOCUMENTS

| | | |
|---|---|---|
| DE | 20 2008 012 289 U1 | 1/2009 |
| JP | 2016-137204 A | 8/2016 |
| WO | 2016/125042 A1 | 8/2016 |

*Primary Examiner* — Mohammed A Rahaman
(74) *Attorney, Agent, or Firm* — Sughrue Mion, PLLC

(57) ABSTRACT

An in-vehicle monitoring module included in a monitoring system includes a detector, a service operator, a controller, and a housing. The detector detects conditions in an inside of a vehicle. The service operator is provided to the vehicle. The controller can perform processing of determining the type of an event occurring in the inside of the vehicle based on the conditions in the inside of the vehicle detected by the detector, controlling the service operator based on the determined type of the event, and causing the service operator to perform an operation corresponding to the type of the event. The housing is provided with the detector, the service operator, and the controller to serve as a unit and provided on a roof member of the vehicle.

12 Claims, 10 Drawing Sheets

(56) References Cited

U.S. PATENT DOCUMENTS

| | | | |
|---|---|---|---|
| 2008/0042810 A1* | 2/2008 | Nakane | B60R 25/1012 340/426.18 |
| 2011/0063099 A1* | 3/2011 | Miller | G07C 5/085 340/439 |
| 2016/0075279 A1* | 3/2016 | Takamatsu | G06F 3/016 701/36 |
| 2016/0221502 A1* | 8/2016 | Gordon | B60R 1/00 |
| 2017/0101054 A1* | 4/2017 | Dusane | G08G 1/096716 |
| 2017/0113664 A1* | 4/2017 | Nix | G06F 11/3072 |
| 2018/0068192 A1* | 3/2018 | Miller | G06K 9/00832 |
| 2018/0086307 A1* | 3/2018 | Spina | B60R 25/305 |

* cited by examiner

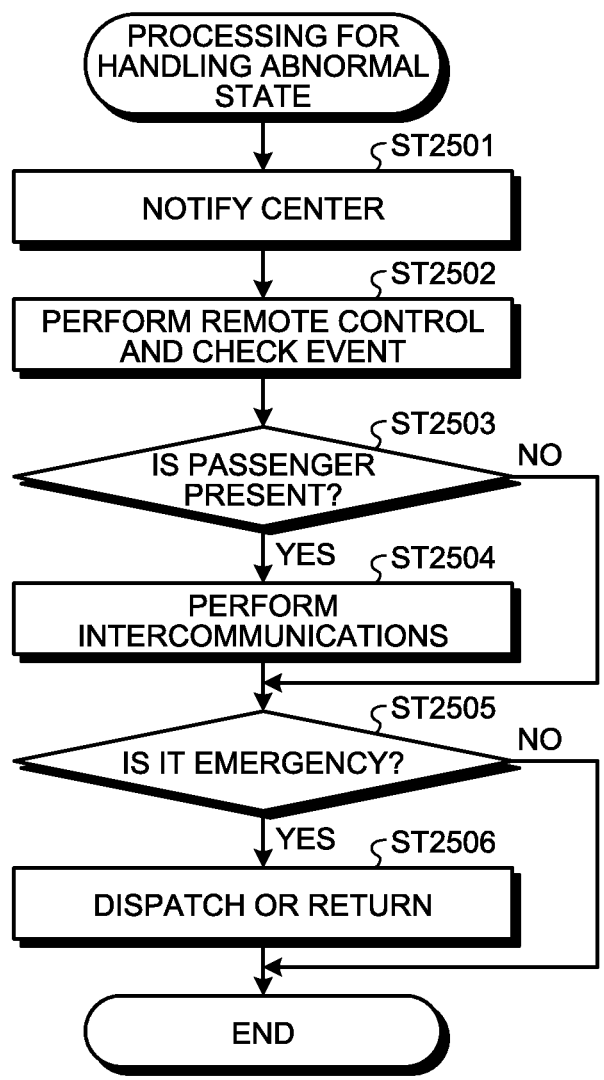

IN-VEHICLE MONITORING MODULE AND MONITORING SYSTEM

CROSS-REFERENCE TO RELATED APPLICATION(S)

The present application claims priority to and incorporates by reference the entire contents of Japanese Patent Application No. 2018-065263 filed in Japan on Mar. 29, 2018.

BACKGROUND OF THE INVENTION

1. Field of the Invention

The present invention relates to an in-vehicle monitoring module and a monitoring system.

2. Description of the Related Art

Various in-vehicle monitoring modules mounted on vehicles are conventionally developed, including a control device for coping with a feeling of a passenger for a vehicle disclosed in Japanese Patent Application Laid-open No. 2016-137204, for example. The device estimates a feeling of a passenger in a vehicle based on biological information on the passenger and improves the feeling of the passenger as necessary.

The device disclosed in Japanese Patent Application Laid-open No. 2016-137204 still has room for improvement in monitoring the inside of a vehicle, for example.

SUMMARY OF THE INVENTION

In view of the circumstances described above, the present invention aims to provide an in-vehicle monitoring module and a monitoring system that can appropriately monitor the inside of a vehicle.

In order to solve the above mentioned problem and achieve the object, an in-vehicle monitoring module according to one aspect of the present invention includes a detector that detects a condition in an inside of a vehicle; a service operator that is provided to the vehicle; a controller that is capable of performing processing of determining a type of an event occurring in the inside of the vehicle based on the condition in the inside of the vehicle detected by the detector, controlling the service operator based on the determined type of the event, and causing the service operator to perform an operation corresponding to the type of the event; and a housing that is provided with the detector, the service operator, and the controller to serve as a unit and provided at an upper part of the inside of the vehicle.

According to another aspect of the present invention, in the in-vehicle monitoring module, it is preferable that the detector includes an imaging device configured to take an image of the inside of the vehicle, thereby detecting the condition in the inside of the vehicle, and the controller determines the type of the event occurring in the inside of the vehicle based on the image of the inside of the vehicle taken by the imaging device.

According to still another aspect of the present invention, in the in-vehicle monitoring module, it is preferable that the detector includes a sound detecting device configured to detect sound in the inside of the vehicle, thereby detecting the condition in the inside of the vehicle, and the controller determines the type of the event occurring in the inside of the vehicle based on the sound in the inside of the vehicle detected by the sound detecting device.

According to still another aspect of the present invention, in the in-vehicle monitoring module, it is preferable that an out-vehicle communicator that is capable of performing communications with an external device provided outside the vehicle, wherein the controller is capable of performing processing of controlling the out-vehicle communicator and transmitting information on the determined type of the event to the external device via the out-vehicle communicator.

According to still another aspect of the present invention, in the in-vehicle monitoring module, it is preferable that the service operator includes an information output device capable of outputting information to the inside of the vehicle, and the controller is capable of performing processing of controlling the information output device and causing the information output device to output information received from the external device via the out-vehicle communicator.

According to still another aspect of the present invention, in the in-vehicle monitoring module, it is preferable that the controller is capable of performing processing of controlling the detector based on information received from the external device via the out-vehicle communicator and remotely controlling the detector and processing of controlling the out-vehicle communicator and transmitting information on the condition in the inside of the vehicle detected by the detector to the external device via the out-vehicle communicator.

According to still another aspect of the present invention, in the in-vehicle monitoring module, it is preferable that an in-vehicle communicator that is capable of performing communications with an on-board device mounted outside the housing of the vehicle, wherein the controller is capable of performing processing of controlling the on-board device via the in-vehicle communicator based on the determined type of the event and causing the on-board device to perform an operation corresponding to the type of the event.

According to still another aspect of the present invention, in the in-vehicle monitoring module, it is preferable that the controller determines presence of a remaining object in the inside, a seat belt non-wearing state of a person in the inside, physical condition deterioration of a person in the inside, a suspicious behavior of a person in the inside, or an abnormal state in the inside as the type of the event.

In order to achieve the object, a monitoring system according to still another aspect of the present invention includes an in-vehicle monitoring module that is mounted on a vehicle; and an external device that is provided outside the vehicle and capable of transmitting and receiving information to and from the in-vehicle monitoring module, wherein the in-vehicle monitoring module comprises: a detector that detects a condition in an inside of the vehicle; a service operator that is provided to the vehicle; a controller that is capable of performing processing of determining a type of an event occurring in the inside of the vehicle based on the condition in the inside of the vehicle detected by the detector, controlling the service operator based on the determined type of the event, and causing the service operator to perform an operation corresponding to the type of the event; and a housing that is provided with the detector, the service operator, and the controller to serve as a unit and provided at an upper part of the inside of the vehicle, and the controller performs processing of causing the service operator to perform the operation corresponding to the type of the event in cooperation with the external device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 11 is a flowchart of an example of processing for handling an abnormal state performed by the in-vehicle monitoring module according to the embodiment.

DETAILED DESCRIPTION OF THE PREFERRED EMBODIMENTS

Exemplary embodiments according to the present invention are described below in greater detail with reference to the accompanying drawings. The embodiments are not intended to limit the present invention. Components in the embodiments include components replaceable and easily conceivable by those skilled in the art and components substantially identical therewith.

Embodiments

Figure 1:
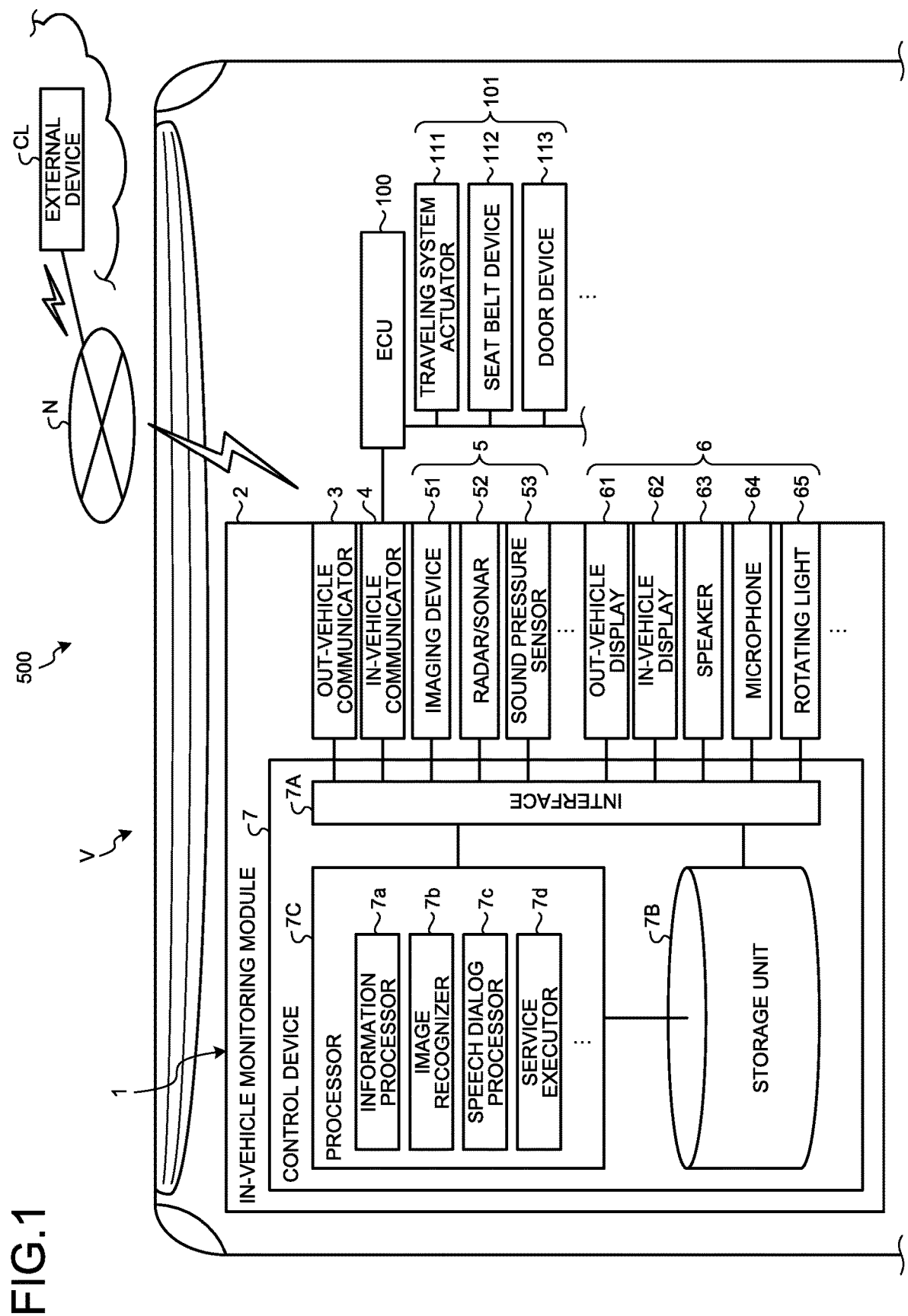
FIG. 1 is a block diagram of a schematic configuration of a monitoring system including an in-vehicle monitoring module according to an embodiment.
Figure 2:
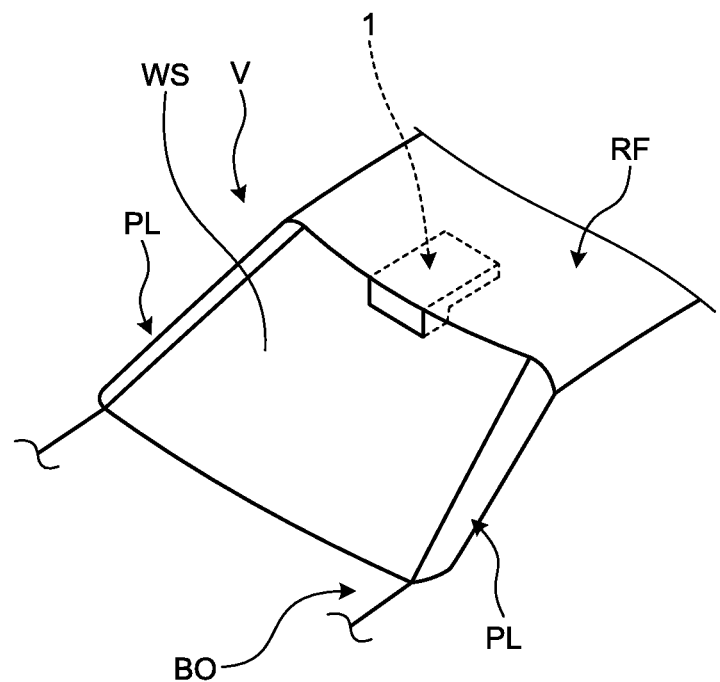
FIG. 2 is a schematic partial perspective view of a mounting example of the in-vehicle monitoring module according to the embodiment.
Figure 3:
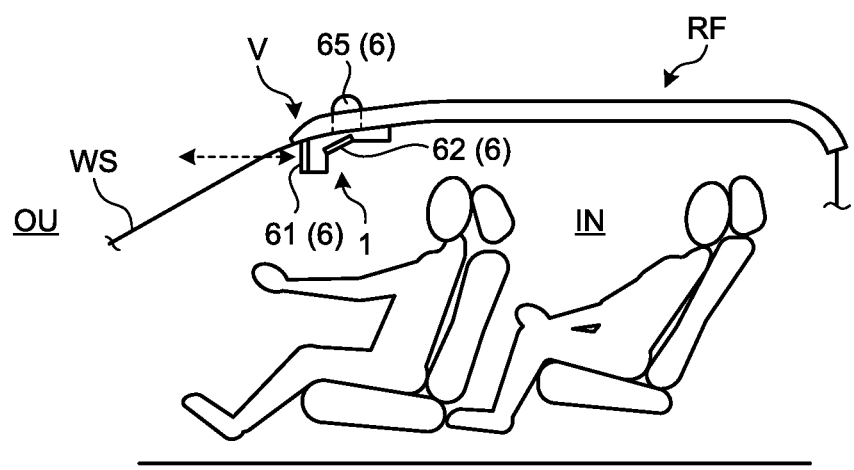
FIG. 3 is a diagram of a schematic configuration of the inside of a vehicle provided with the in-vehicle monitoring module according to the embodiment.

An in-vehicle monitoring module 1 according to an embodiment of the present invention illustrated in FIGS. 1, 2, and 3 is an on-board system mounted on a vehicle V. The in-vehicle monitoring module 1 according to the present embodiment is a structural module for monitoring conditions in an inside IN of the vehicle V and performing various kinds of processing depending on the conditions. The in-vehicle monitoring module 1 according to the present embodiment with its main part serving as a unit is disposed at the upper part of the inside IN of the vehicle V, that is, on a roof member (roof) RF in this example. The in-vehicle monitoring module 1 thus serves as an on-roof intensively arranged monitoring unit. The roof member RF is a structure positioned at the upper part of the vehicle V in the vertical direction and serving as the exterior of the vehicle V. The roof member RF is coupled to a vehicle body BO with a plurality of pillars PL having a hollow columnar shape and supported above the vehicle body BO in the vertical direction. The vehicle V is divided into an outside OU and the inside IN with respect to the roof member RF defining the upper boundary in the vertical direction. The in-vehicle monitoring module 1 is electrically connected to a power source via electric power wires (electric wires) extending in the internal spaces of the pillars PL having a hollow columnar shape, for example, and supplied with electric power. The in-vehicle monitoring module 1 serves as a monitoring system 500 together with an external device CL provided outside the vehicle V. The monitoring system 500 according to the present embodiment includes the in-vehicle monitoring module 1 and the external device CL. The in-vehicle monitoring module 1 is mounted on the vehicle V. The external device CL is provided outside the vehicle V and can transmit and receive information to and from the in-vehicle monitoring module 1. The in-vehicle monitoring module 1 according to the present embodiment performs various kinds of processing in cooperation with the external device CL. The in-vehicle monitoring module 1 is provided by mounting the components illustrated in FIG. 1 on the vehicle V. The following describes the components of the in-vehicle monitoring module 1 in greater detail with reference to FIGS. 1, 2, and 3.

In the in-vehicle monitoring module 1 illustrated in FIG. 1, the connection system between the components for power supply and transmission and reception of control signals, various kinds of information, and the like may be wired connection via wiring materials, such as electric wires and optical fibers (including optical communications via optical fibers, for example) or wireless connection, such as wireless communications and contactless power supply. The vehicle V provided with the in-vehicle monitoring module 1 may be any kind of vehicles including a motor or an engine as a drive source, such as an electric vehicle (EV), a hybrid electric vehicle (HEV), a plug-in hybrid electric vehicle (PHEV), a gasoline vehicle, and a diesel vehicle. The method for driving the vehicle V may be any one of manual driving by a driver, semi-automatic driving, and full-automatic driving, for example. The vehicle V may be any one of what is called a private car owned by an individual, a rental car, a shared car, a bus, a taxi, and a ride-sharing car. In the following description, for example, the vehicle V is a vehicle, such as a bus, a taxi, and a ride-sharing car, managed by a specific service provider, used by an unspecified large number of users, and capable of full-automatic driving of automatically moving to a getting-on/off position reserved by the users. In full-automatic driving, no driver may possibly be present in the vehicle V.

Specifically, the in-vehicle monitoring module 1 includes a housing 2, an out-vehicle communicator 3, an in-vehicle communicator 4, a detector 5, a service operator 6, and a control device 7. The in-vehicle monitoring module 1 is a unit of the housing 2, the out-vehicle communicator 3, the in-vehicle communicator 4, the detector 5, the service operator 6, and the control device 7. The in-vehicle monitoring module 1 may further include a room lamp and various operating parts, for example, besides the components described above.

The housing 2 is provided with the out-vehicle communicator 3, the in-vehicle communicator 4, the detector 5, the service operator 6, and the control device 7 of the in-vehicle monitoring module 1. The housing 2 is made of insulating synthetic resin, for example. The housing 2 may have a hollow box shape as a whole combining a plurality of members, for example. The housing 2 accommodates the out-vehicle communicator 3, the in-vehicle communicator 4, the detector 5, the service operator 6, and the control device 7 fixed to the inside of the hollow box part, whereby the in-vehicle monitoring module 1 serves as a unit. Part of the out-vehicle communicator 3, the in-vehicle communicator 4, the detector 5, the service operator 6, and other components accommodated in the housing 2 are exposed to the outside. The housing 2 is provided at the upper part of the inside IN of the vehicle V, that is, on the roof member RF in this example. Typically, the housing 2 is preferably provided at the upper part of the inside IN of the vehicle V and at the position that enables the in-vehicle monitoring module 1 to survey all the passengers in the inside IN (position that enables an imaging device 51, which will be described later, to image all the passengers in the inside IN). More specifically, the housing 2 is fixed to the surface of the roof member RF on the inside IN side. The housing 2, for example, is provided at the intersection of the roof member RF and a wind shield WS and approximately at the center of the vehicle V in the vehicle width direction. The wind shield WS is provided at the front part of the vehicle V and defines the boundary between the inside IN and the outside OU. The wind shield WS is made of a light transmissive member that allows light passing therethrough and also called a front glass. The entire in-vehicle monitoring module 1 according to the present embodiment is provided on the surface of the roof member RF of the vehicle V on the inside IN side. The in-vehicle monitoring module 1 is an over-head module (OHM) or a roof module (RM) integrating various functions.

The out-vehicle communicator 3 is a wireless communication functional part mounted on the vehicle V. The out-vehicle communicator 3 is a communication module that wirelessly connects the vehicle V and a network N outside the vehicle V. The network N connects the in-vehicle monitoring module 1 and a device outside the vehicle V in a communicable manner. The network N may be any desired wired or wireless communication network. The out-vehicle communicator 3 transmits and receives information between a device connected to the network N and the in-vehicle monitoring module 1. The out-vehicle communicator 3 can communicate with a device outside the vehicle V via the network N by various kinds of wireless communications, such as wide-area wireless communications and narrow-area wireless communications. Examples of the wide-area wireless communications include, but are not limited to, radio (AM and FM), TV (UHF, 4K, and 8K), TEL, GPS, WiMAX (registered trademark), etc. Examples of the narrow-area wireless communications include, but are not limited to, ETC/DSRC, VICS (registered trademark), wireless local area network (LAN), millimeter wave communications, etc. The out-vehicle communicator 3 according to the present embodiment transmits and receives information to and from the external device CL connected to the network N via at least the network N. In other words, the out-vehicle communicator 3 according to the present embodiment can communicate with at least the external device CL serving as a device outside the vehicle V. The external device CL is a cloud service device implemented on the network N outside the vehicle V and serves as a center in what is called a cloud service. The external device CL can transmit and receive information to and from the in-vehicle monitoring module 1 (vehicle V) via the network N. The external device CL may be provided by installing an application that performs various kinds of processing in a computer system, such as a known personal computer (PC) and a workstation. The in-vehicle monitoring module 1 communicates and cooperates with the external device CL via the out-vehicle communicator 3, thereby receiving various cloud services from the external device CL. The out-vehicle communicator 3 serves as part of the service operator 6, which will be described later.

The in-vehicle communicator 4 is a communication relay functional part mounted on the vehicle V. The in-vehicle communicator 4 can communicate with an electronic control unit (ECU) 100 and an on-board device 101 mounted on the vehicle V via an on-board network, for example. In other words, the in-vehicle communicator 4 can transmit and receive various kinds of information to and from the ECU 100 and the on-board device 101 mounted on the vehicle V. The ECU 100 is an electronic control unit that collectively controls the entire vehicle V including the on-board device 101 and other components. The ECU 100 may be part of the in-vehicle monitoring module 1. In other words, the in-vehicle monitoring module 1 may include the ECU 100. The on-board device 101 is mounted outside the housing 2 of the vehicle V and implements various functions. A plurality of on-board devices 101 are provided. The in-vehicle communicator 4 transmits and receives information to and from the on-board devices 101 connected to the ECU 100 via the ECU 100. The in-vehicle communicator 4 may have a router function to perform routing and a gateway function to perform protocol conversion, for example. The on-board devices 101 according to the present embodiment include a traveling system actuator 111, a seat belt device 112, and a door device 113, for example. The traveling system actuator 111 is various devices that causes the vehicle V to travel. Typically, the traveling system actuator 111 includes a traveling power train, a steering device, and a braking device, for example. The traveling power train is a driving device that causes the vehicle V to travel. The steering device steers the vehicle V. The braking device brakes the vehicle V. The seat belt device 112 electrically locks seat belts of the vehicle V. The door device 113 electrically opens and closes doors for getting-on/off the vehicle V and a locking mechanism of the doors. The in-vehicle communicator 4 may be part of the service operator 6, which will be described later.

The detector 5 detects the conditions in the inside IN of the vehicle V. The detector 5 detects inside condition information indicating the conditions in the inside IN of the vehicle V. The inside condition information may include information indicating an internal environment of the vehicle V, information indicating the presence, the position, and the state of a person and an object in the vehicle V, and information indicating whether a person sits on a seat of the vehicle V and whether the person wears a seat belt, for example. The detector 5 illustrated in FIG. 1 includes the imaging device 51, a radar/sonar 52, and a sound pressure sensor 53 serving as a sound detecting device, for example. The imaging device 51 takes images of the inside IN of the vehicle V, thereby detecting the inside condition information indicating the conditions in the inside IN of the vehicle V. The imaging device 51 is fixed to the housing 2. The angle of view of the imaging device 51 is adjusted such that the imaging range covers the whole area of the inside IN of the vehicle V, for example. If a single imaging device 51 fails to cover the whole area of the inside IN of the vehicle V, a plurality of imaging devices 51 may be provided to cover the whole area of the inside IN of the vehicle V. The imaging device 51, for example, may be a single-lens camera that can take two-dimensional images or a stereo camera that can take three-dimensional images. The imaging device 51 may be what is called a time of flight (TOF) camera, for example. The radar/sonar 52 detects the inside condition information indicating the conditions in the inside IN of the vehicle V using infrared rays, millimeter waves, ultrasonic waves, or the like. The radar/sonar 52 is fixed to the housing 2 and adjusted such that the detection range covers the whole area of the inside IN of the vehicle V, for example. If a single radar/sonar 52 fails to cover the whole area of the inside IN of the vehicle V, a plurality of radars/sonars 52 may be provided to cover the whole area of the inside IN of the vehicle V. The sound pressure sensor 53 detects sound in the inside IN of the vehicle V, thereby detecting the inside condition information indicating the conditions in the inside IN of the vehicle V. While the sound pressure sensor 53 is described as a device that detects the sound pressure of sound in the inside IN of the vehicle V, it may be what is called a sound collecting microphone, for example. If a sound pressure sensor 53 fails to cover the whole area of the inside IN of the vehicle V, a plurality of sound pressure sensors 53 may be provided to cover the whole area of the inside IN of the vehicle V. The detector 5 may include an acquirer that acquires the inside condition information from a processor, such as the ECU 100, via the in-vehicle communicator 4 and the on-board network. The information detected by the detector 5 (the imaging device 51, the radar/sonar 52, and the sound pressure sensor 53) is used by the control device 7 to determine the type of an event occurring in the inside IN performed, for example.

The service operator 6 is provided to the vehicle V and performs, in the inside IN of the vehicle V, a service operation corresponding to the type of an event occurring in the inside IN of the vehicle V. The service operator 6 according to the present embodiment includes an out-vehicle display 61, an in-vehicle display 62, a speaker 63, a microphone 64, and a rotating light 65, for example. The out-vehicle display 61 is an out-vehicle information output device that can output information to the outside OU of the vehicle V. The out-vehicle display 61 displays (outputs) image information (visual information) to the outside OU of the vehicle V. Examples of the out-vehicle display 61 may include, but are not limited to, a flat-panel liquid crystal display, a plasma display, an organic electroluminescence (EL) display, etc. The out-vehicle display 61 is fixed to the housing 2 and displays the image information at the position that enables the image information to be transmitted through the wind shield WS and viewed from the outside OU of the vehicle V. The in-vehicle display 62 and the speaker 63 are in-vehicle information output devices that can output information to the inside IN of the vehicle V. The in-vehicle display 62 displays (outputs) image information (visual information), such as figures and characters, to the inside IN of the vehicle V. Examples of the in-vehicle display 62 may include, but are not limited to, a flat-panel liquid crystal display, a plasma display, an organic EL display, etc. The in-vehicle display 62 is fixed to the housing 2 and displays the image information at the position that enables the image information to be viewed from all the seats in the inside IN of the vehicle V. The speaker 63 outputs sound information (auditory information) to the inside IN of the vehicle V. The speaker 63, for example, may be a highly directive speaker that enables only a specific passenger required to be supplied with the information to hear the sound information in the inside IN of the vehicle V. Similarly, the in-vehicle display 62, for example, may enable only a specific passenger required to be supplied with the information to view the image information in the inside IN of the vehicle V. In this case, a plurality of in-vehicle displays 62 may be provided corresponding to the respective passengers, for example. The microphone 64 is a sound collecting device that converts sound generated in the inside IN of the vehicle V into electrical signals. The rotating light 65 informs the outside OU of the vehicle V that the vehicle V is traveling in emergency. The rotating light 65, for example, reflects light output from a light source with a reflecting mirror that rotates around the light source, thereby rotationally outputting the light in the horizontal direction. The rotating light 65 thus informs the surroundings that the vehicle V is traveling in emergency. The rotating light 65 is fixed to the housing 2 and passes through part of the roof member RF to be exposed to the outside OU of the vehicle V.

The control device 7 collectively controls the units of the in-vehicle monitoring module 1. The control device 7 monitors the conditions in the inside IN of the vehicle V and performs various kinds of arithmetic processing for performing various kinds of corresponding processing depending on the conditions. The control device 7 includes an electronic circuit mainly provided by a known micro-computer including a central arithmetic processing unit, such as a central processing unit (CPU), a micro processing unit (MPU), an application specific integrated circuit (ASIC), and a field programmable gate array (FPGA), a read only memory (ROM), a random access memory (RAM), and an interface. The control device 7 is electrically connected to the out-vehicle communicator 3, the in-vehicle communicator 4, the detector 5, and the service operator 6. The control device 7 can supply and receive, to and from the units described above, various electrical signals, such as various detection signals and drive signals for driving the units.

Specifically, the control device 7 functionally and conceptually includes an interface 7A, a storage unit 7B, and a processor 7C. The interface 7A, the storage unit 7B, and the processor 7C can supply and receive various kinds of information to and from various devices electrically connected thereto. The interface 7A transmits and receives various kinds of information to and from the units of the in-vehicle monitoring module 1, such as the out-vehicle communicator 3, the in-vehicle communicator 4, the detector 5, and the service operator 6. The interface 7A has a function to transmit and receive information to and from the units by wired communications via electric wires and a function to transmit and receive information to and from the units by wireless communications via a wireless communication unit, for example. The storage unit 7B stores therein various kinds of information. The storage unit 7B may be a storage device having relatively large capacity, such as a hard disk, a solid state drive (SSD), and an optical disc, or a data-rewritable semiconductor memory, such as a RAM, a flash memory, and a non-volatile static random access memory (NVSRAM). The storage unit 7B stores therein conditions and information necessary for various kinds of processing performed by the control device 7, various computer programs and applications executed by the control device 7, and control data, for example. The storage unit 7B, for example, stores therein event type determination information used for determination of the type of an event occurring in the inside IN of the vehicle V as a database. The storage unit 7B, for example, can temporarily store therein various kinds of information received by the out-vehicle communicator 3 and the in-vehicle communicator 4 and the inside condition information detected by the detector 5. These pieces of information are read from the storage unit 7B by the processor 7C, for example, as necessary. Based on various input signals, for example, the processor 7C executes the various computer programs stored in the storage unit 7B and causes the computer programs to operate, thereby outputting output signals to the units and performing various kinds of processing to implement various functions.

More specifically, the processor 7C can perform processing of determining the type of an event occurring in the inside IN of the vehicle V based on the conditions in the inside IN of the vehicle V detected by the detector 5. The processor 7C can perform processing of controlling the service operator 6 based on the determined type of an event and causing the service operator 6 to perform an operation corresponding to the type of the event. The processor 7C can perform processing of controlling the service operator 6 based on the determined type of an event and causing the service operator 6 to perform an operation corresponding to the type of the event in cooperation with the external device CL. The processor 7C can perform processing of controlling the out-vehicle communicator 3 and transmitting occurring event type information on the determined type of an event to the external device CL via the out-vehicle communicator 3. The processor 7C can perform processing of controlling the out-vehicle display 61, the in-vehicle display 62, the speaker 63, and other components and causing them to output output information received from the external device CL via the out-vehicle communicator 3. The processor 7C can perform processing of controlling the detector 5 based on remote control information received from the external device CL via the out-vehicle communicator 3 and remotely controlling the detector 5. The processor 7C can perform processing of controlling the out-vehicle communicator 3 and transmitting the inside condition information on the conditions in the inside IN of the vehicle V detected by the detector 5 to the external device CL via the out-vehicle communicator 3. The processor 7C can perform processing of controlling the on-board devices 101 via the in-vehicle communicator 4 based on the determined type of an event and causing the on-board devices 101 to perform an operation corresponding to the type of the event. To perform the processing described above, the processor 7C according to the present embodiment functionally and conceptually includes an information processor 7a, an image recognizer 7b, a speech dialog processor 7c, and a service executor 7d.

Figure 4:
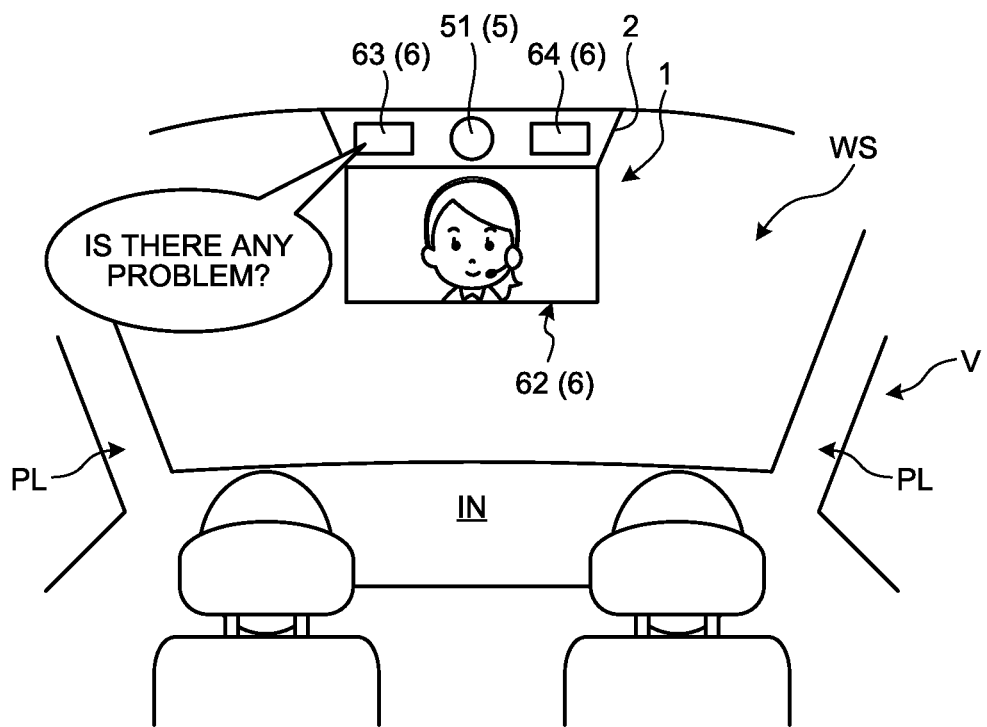
FIG. 4 is another diagram of a schematic configuration of the inside of the vehicle provided with the in-vehicle monitoring module according to the embodiment.

The information processor 7a has a function to perform processing relating to various kinds of information used in the in-vehicle monitoring module 1. The information processer 7a according to the present embodiment has a function to perform processing of controlling the detector 5 and causing the detector 5 to detect the inside condition information. The information processor 7a, for example, performs processing of controlling the imaging device 51 and causing the imaging device 51 to take an image of the inside IN of the vehicle V and detect the inside condition information. The information processor 7a performs processing of controlling the radar/sonar 52 and causing the radar/sonar 52 to detect the inside condition information using infrared rays, millimeter waves, ultrasonic waves, or the like. The information processor 7a performs processing of controlling the sound pressure sensor 53 and causing the sound pressure sensor 53 to detect sound in the inside IN of the vehicle V and detect the inside condition information. The information processor 7a performs processing of storing the inside condition information detected by the detector 5 in the storage unit 7B. The information processor 7a according to the present embodiment can perform processing of controlling the out-vehicle communicator 3 and causing the out-vehicle communicator 3 to transmit and receive various kinds of information to and from the external device CL. The information processor 7a performs processing of reading information to be transmitted by the out-vehicle communicator 3 from the storage unit 7B and processing of storing information received by the out-vehicle communicator 3 in the storage unit 7B. The information processor 7a, for example, performs processing of transmitting, to the external device CL via the out-vehicle communicator 3, the occurring event type information on the type of an event determined by the image recognizer 7b and the speech dialog processor 7c, which will be described later. The occurring event type information is information on the type of an event occurring in the inside IN of the vehicle V and on the type of the event determined by the image recognizer 7b and the speech dialog processor 7c based on the inside condition information detected by the detector 5. The information processor 7a performs processing of receiving the output information to be output by the out-vehicle display 61, the in-vehicle display 62, and the speaker 63 from the external device CL via the out-vehicle communicator 3. The output information is information to be output from the out-vehicle display 61, the in-vehicle display 62, and the speaker 63. As illustrated in FIG. 4, for example, the output information includes image information to be displayed on the out-vehicle display 61 and the in-vehicle display 62 and sound information to be output from the speaker 63. The information processor 7a performs processing of receiving the remote control information for remotely controlling the detector 5 from the external device CL via the out-vehicle communicator 3. The remote control information is information for remotely controlling the detector 5 based on instructions from the external device CL. The information processor 7a can perform processing of transmitting the inside condition information detected by the detector 5 to the external device CL via the out-vehicle communicator 3. The information processor 7a according to the present embodiment has a function to perform processing of controlling the in-vehicle communicator 4 and causing the in-vehicle communicator 4 to transmit and receive various kinds of information to and from the on-board devices 101. The information processor 7a performs processing of reading, from the storage unit 7B, the information transmitted by the in-vehicle communicator 4 and processing of storing the information received by the in-vehicle communicator 4 in the storage unit 7B. The information processor 7a performs processing of transmitting and receiving various kinds of information to and from the on-board devices 101 via the ECU 100. The information processor 7a, for example, performs processing of transmitting information used for operating the traveling system actuator 111, the seat belt device 112, and the door device 113 by the service executor 7d, which will be described later, to the traveling system actuator 111, the seat belt device 112, and the door device 113 via the in-vehicle communicator 4.

The image recognizer 7b has a function to perform processing of determining the type of an event occurring in the inside IN of the vehicle V based on the inside condition information indicating the conditions in the inside IN of the vehicle V detected by the detector 5. The image recognizer 7b serves as an event determiner that determines the type of an event occurring in the inside IN of the vehicle V together with the speech dialog processor 7c, which will be described later. The image recognizer 7b according to the present embodiment determines the type of an event occurring in the inside IN of the vehicle V using various known artificial intelligence and/or deep learning techniques, for example. The image recognizer 7b, for example, determines the type of an event occurring in the inside IN of the vehicle V based on the inside condition information detected by the detector 5 and the event type determination information stored in the storage unit 7B. The event type determination information reflects the results of leaning of the types of events occurring in the inside IN of the vehicle V based on the inside condition information and other information by various methods using the artificial intelligence technique and/or the deep learning technique. In other words, the event type determination information is a database obtained by the various methods using the artificial intelligence technique and/or the deep learning technique to estimate the type of an event occurring in the inside IN of the vehicle V based on the inside condition information and other information. The image recognizer 7b determines the presence of a remaining object in the inside IN, a seat belt non-wearing state of a person in the inside IN, physical condition deterioration of a person in the inside IN, or a suspicious behavior (e.g., damage to articles, theft, and injurious assault) of a person in the inside IN as the type of an event. In other words, the types of events determined by the control device 7 include the presence of a remaining object in the inside IN, a seat belt non-wearing state of a person in the inside IN, physical condition deterioration of a person in the inside IN, and a suspicious behavior of a person in the inside IN, for example. The image recognizer 7b according to the present embodiment determines the type of an event occurring in the inside IN of the vehicle V based on the image information indicating an image of the inside IN of the vehicle V taken by the imaging device 51 included in the detector 5. In other words, the image recognizer 7b determines the type of the event based on the image information included in the inside condition information and on the event type determination information stored in the storage unit 7B. The image recognizer 7b, for example, can determine the presence of a remaining object in the inside IN based on a difference image between the image information obtained before a passenger gets on the vehicle V and the image information obtained after the passenger gets off the vehicle V. The image recognizer 7b, for example, can determine a seat belt non-wearing state of a person in the inside IN based on the image of a seat belt included in the image information. The image recognizer 7b, for example, can determine physical condition deterioration of a person in the inside IN and a suspicious behavior of a person in the inside IN by comparing a behavior and an expression of the person in the inside IN of the vehicle V with the event type determination information stored in the storage unit 7B.

The speech dialog processor 7c has a function to perform processing of determining the type of an event occurring in the inside IN of the vehicle V based on the inside condition information indicating the conditions in the inside IN of the vehicle V detected by the detector 5. The speech dialog processor 7c serves as the event determiner that determines the type of an event occurring in the inside IN of the vehicle V together with the image recognizer 7b. The speech dialog processor 7c, for example, determines occurrence of an abnormal state (state capable of being determined based on the sound information) in the inside IN as the type of an event. In other words, the types of events determined by the control device 7 further include an abnormal state in the inside IN, for example. The speech dialog processor 7c according to the present embodiment determines the type of an event occurring in the inside IN of the vehicle V based on the sound information indicating sound in the inside IN of the vehicle V detected by the sound pressure sensor 53 included in the detector 5. The speech dialog processor 7c, for example, can determine an abnormal state in the inside IN when the sound pressure of the sound in the inside IN of the vehicle V detected by the sound pressure sensor 53 is equal to or higher than a predetermined threshold.

The service executor 7d has a function to perform processing of controlling the service operator 6 based on the type of an event determined by the image recognizer 7b and the speech dialog processor 7c and causing the service operator 6 to perform an operation corresponding to the type of the event. If the image recognizer 7b determines the presence of a remaining object in the inside IN, the service executor 7d according to the present embodiment performs at least part of processing for handling a remaining object, thereby causing the service operator 6 to perform an operation for handling a remaining object (e.g., refer to FIG. 6, which will be described later). If the image recognizer 7b determines a seat belt non-wearing state of a person in the inside IN, the service executor 7d performs at least part of processing for handling a seat belt non-wearing state, thereby causing the service operator 6 to perform an operation for handling a seat belt non-wearing state (e.g., refer to FIG. 7, which will be described later). If the image recognizer 7b determines physical condition deterioration of a person in the inside IN, the service executor 7d performs at least part of processing for handling physical condition deterioration, thereby causing the service operator 6 to perform an operation for handling physical condition deterioration (e.g., refer to FIG. 8, which will be described later). If the image recognizer 7b determines a suspicious behavior of a person in the inside IN, the service executor 7d performs at least part of processing for handling a suspicious behavior, thereby causing the service operator 6 to perform an operation for handling a suspicious behavior (e.g., refer to FIG. 9, which will be described later). If the speech dialog processor 7c determines an abnormal state in the inside IN, the service executor 7d performs at least part of processing for handling an abnormal state, thereby causing the service operator 6 to perform an operation for handling an abnormal state (e.g., refer to FIG. 11, which will be described later). The service executor 7d can also perform processing of controlling the on-board devices 101 including the traveling system actuator 111, the seat belt device 112, and the door device 113 via the in-vehicle communicator 4 based on the type of an event determined by the image recognizer 7b and causing the on-board devices 101 to perform an operation corresponding to the type of the event.

Figure 5:
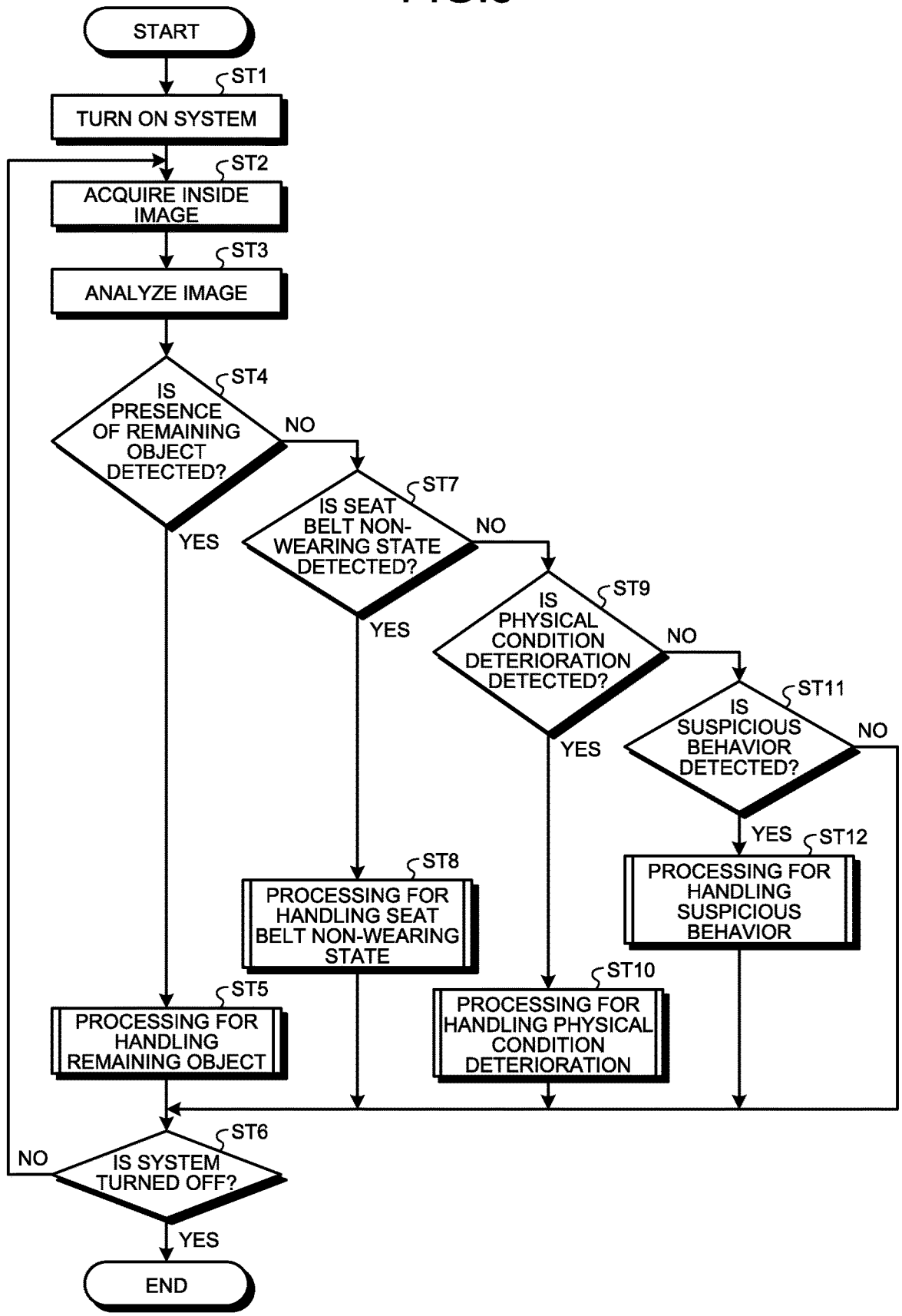
FIG. 5 is a flowchart of an example of control performed by the in-vehicle monitoring module according to the embodiment.

The following describes an outline of an example of control performed by the in-vehicle monitoring module 1 with reference to the flowchart in FIG. 5. Subsequently, the following describes specific examples of the processing for handling a remaining object, a seat belt non-wearing state, physical condition deterioration, and a suspicious behavior with reference to FIGS. 6, 7, 8, and 9, respectively.

If the ignition of the vehicle V is turned on, for example, the control device 7 turns on the system implemented by the in-vehicle monitoring module 1 (Step ST1).

Subsequently, the information processor 7a of the control device 7 controls the imaging device 51 and causes the imaging device 51 to take an image of the inside IN of the vehicle V and detect the inside condition information. The information processor 7a acquires the inside condition information including the image information of the inside IN (Step ST2).

Subsequently, the image recognizer 7b of the control device 7 analyzes the image information indicating the image of the inside IN of the vehicle V included in the inside condition information acquired at Step ST2. The image recognizer 7b determines the type of an event occurring in the inside IN of the vehicle V based on the image information indicating the image of the inside IN of the vehicle V as described above (Step ST3).

Subsequently, the image recognizer 7b determines whether the presence of a remaining object in the inside IN is determined as the type of an event occurring in the inside IN of the vehicle V (Step ST4).

If the presence of a remaining object in the inside IN is determined as the type of an event occurring in the inside IN of the vehicle V at Step ST4 (Yes at Step ST4), the service executor 7d of the control device 7 performs the processing for handling a remaining object (Step ST5), and the process proceeds to Step ST6.

If the presence of a remaining object in the inside IN is not determined at Step ST4 (No at Step ST4), the image recognizer 7b determines whether a seat belt non-wearing state of a person in the inside IN is determined as the type of an event occurring in the inside IN of the vehicle V (Step ST7).

If a seat belt non-wearing state of a person in the inside IN is determined as the type of an event occurring in the inside IN of the vehicle V at Step ST7 (Yes at Step ST7), the service executor 7d performs the processing for handling a seat belt non-wearing state (Step ST8), and the process proceeds to Step ST6.

If a seat belt non-wearing state of a person in the inside IN is not determined at Step ST7 (No at Step ST7), the image recognizer 7b determines whether physical condition deterioration of a person in the inside IN is determined as the type of an event occurring in the inside IN of the vehicle V (Step ST9).

If physical condition deterioration of a person in the inside IN is determined as the type of an event occurring in the inside IN of the vehicle V at Step ST9 (Yes at Step ST9), the service executor 7d performs the processing for handling physical condition deterioration (Step ST10), and the process proceeds to Step ST6.

If physical condition deterioration of a person in the inside IN is not determined at Step ST9 (No at Step ST9), the image recognizer 7b determines whether a suspicious behavior of a person in the inside IN is determined as the type of an event occurring in the inside IN of the vehicle V (Step ST11).

If a suspicious behavior of a person in the inside IN is determined as the type of an event occurring in the inside IN of the vehicle V at Step ST11 (Yes at Step ST11), the service executor 7d performs the processing for handling a suspicious behavior (Step ST12), and the process proceeds to Step ST6.

If the image recognizer 7b determines no suspicious behavior of a person in the inside IN at Step ST11 (No at Step ST11), the process proceeds to Step ST6.

At Step ST6, the control device 7 determines whether the system implemented by the in-vehicle monitoring module 1 is turned off in response to turning-off of the ignition of the vehicle V, for example (Step ST6). If the control device 7 determines that the system is not turned off (No at Step ST6), the control device 7 performs the processing at Step ST2 and the processing subsequent thereto again. If the control device 7 determines that the system is turned off (Yes at Step ST6), the control device 7 ends this control.

Figure 6:
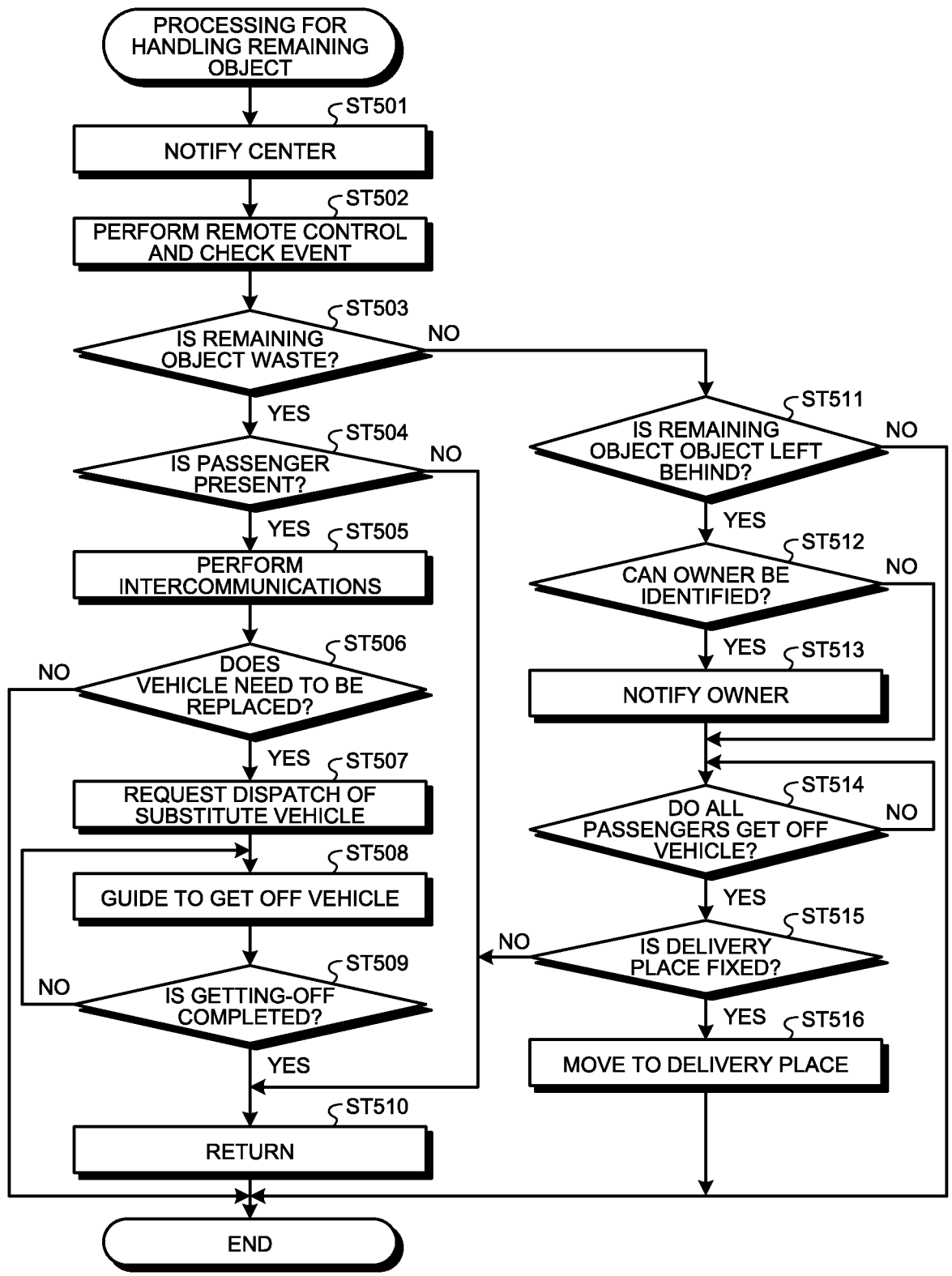
FIG. 6 is a flowchart of an example of processing for handling a remaining object performed by the in-vehicle monitoring module according to the embodiment.

The following describes an outline of an example of the processing for handling a remaining object with reference to the flowchart in FIG. 6.

In the processing for handling a remaining object, the information processor 7a controls the out-vehicle communicator 3 and transmits the occurring event type information on the type of an event determined by the image recognizer 7b to the external device CL via the out-vehicle communicator 3. In this processing, the information processor 7a transmits the occurring event type information indicating the presence of a remaining object in the inside IN to the external device CL. As a result, the information processor 7a notifies the external device CL, which is the center, of the presence of a remaining object in the inside IN of the vehicle V (Step ST501).

Subsequently, the information processor 7a controls the out-vehicle communicator 3 and receives the remote control information from the external device CL via the out-vehicle communicator 3. As a result, the information processor 7a controls the detector 5 based on the remote control information received from the external device CL via the out-vehicle communicator 3 and remotely controls the detector 5 based on instructions from the external device CL. An operator of a service provider that manages the external device CL (hereinafter, which may be simply referred to as an "operator"), for example, remotely controls the angle of view of the imaging device 51, thereby causing the imaging device 51 to take an image of the whole area of the inside IN of the vehicle V. The information processor 7a controls the out-vehicle communicator 3 and transmits the inside condition information detected by the detector 5 to the external device CL via the out-vehicle communicator 3. The information processor 7a transmits, as the inside condition information, the image information obtained by the remotely controlled imaging device 51 and the sound information on sound detected by the sound pressure sensor 53 to the external device CL via the out-vehicle communicator 3. As a result, the operator can check the detail of the event occurring in the inside IN of the vehicle V, for example (Step ST502).

Subsequently, the image recognizer 7b determines whether the remaining object in the inside IN is waste (e.g., trash, vomit, or dirt) (Step ST503). The image recognizer 7b can determine whether the remaining object in the inside IN is waste based on the image information obtained by the imaging device 51, for example. Alternatively, the image recognizer 7b may determine whether the remaining object in the inside IN is waste based on information input by the operator who checks the detail of the event at Step ST502 via the external device CL, the out-vehicle communicator 3, and other components. If the image recognizer 7b determines that the remaining object in the inside IN is waste (Yes at Step ST503), the process proceeds to Step ST504. If the image recognizer 7b determines that the remaining object in the inside IN is not waste (No at Step ST503), the process proceeds to Step ST511.

At Step ST504, the image recognizer 7b determines whether a passenger is present in the inside IN of the vehicle V (whether there is a passenger) (Step ST504). The image recognizer 7b can determine whether a passenger is present in the inside IN of the vehicle V based on the image information obtained by the imaging device 51, for example. Alternatively, the image recognizer 7b may determine whether a passenger is present in the inside IN of the vehicle V based on information input by the operator who checks the detail of the event at Step ST502 via the external device CL, the out-vehicle communicator 3, and other components. If the image recognizer 7b determines that a passenger is present in the inside IN of the vehicle V (Yes at Step ST504), the process proceeds to Step ST505. If the image recognizer 7b determines that no passenger is present in the inside IN of the vehicle V (No at Step ST504), the process proceeds to Step ST510.

At Step ST505, the information processor 7a controls the out-vehicle communicator 3 and performs intercommunications with the external device CL via the out-vehicle communicator 3 (Step ST505). In this case, the service executor 7d turns on the in-vehicle display 62, the speaker 63, the microphone 64, and other components serving as the service operator 6 and enables them to perform intercommunications with the information processor 7a. The information processor 7a, for example, receives the output information input to the external device CL by the operator from the external device CL via the out-vehicle communicator 3. The service executor 7d causes the in-vehicle display 62 to display the image information included in the received output information for the passenger in the inside IN. The service executor 7d also causes the speaker 63 to output the sound information included in the received output information for the passenger in the inside IN. As a result, as illustrated in FIG. 4, the service executor 7d can display an image of the operator on the in-vehicle display 62 and output the voice guidance of "Is there any problem?" from the speaker 63, for example. In this case, the service executor 7d may read the image information and the sound information stored in advance in the storage unit 7B based on instruction information input to the external device CL by the operator, for example, instead of using the output information transmitted from the external device CL. The service executor 7d may output, from the in-vehicle display 62 and the speaker 63, the image information and the sound information read from the storage unit 7B. The information processor 7a, for example, controls the out-vehicle communicator 3 and transmits speech information of the passenger collected by the microphone 64 to the external device CL via the out-vehicle communicator 3. As a result, the service executor 7d, for example, enables intercommunications between the passenger in the inside IN and the operator on the external device CL side and enables them to communicate with each other.

Subsequently, the service executor 7d determines whether the vehicle V needs to be replaced for disposal of the waste (Step ST506). The service executor 7d can determine whether the vehicle V needs to be replaced based on the image information obtained by the imaging device 51, for example. Alternatively, the service executor 7d may determine whether the vehicle V needs to be replaced based on information input by the operator who checks the detail of the event at Step ST502 or the operator who performs intercommunications at Step ST505 via the external device CL, the out-vehicle communicator 3, and other components. If the service executor 7d determines that the vehicle V needs to be replaced (Yes at Step ST506), the process proceeds to Step ST507. If the service executor 7d determines that the vehicle V need not be replaced (No at Step ST506), the service executor 7d ends the processing for handling a remaining object.

At Step ST507, the service executor 7d requests dispatch of a substitute vehicle (Step ST507). In this case, the information processor 7a, for example, controls the out-vehicle communicator 3 and transmits information on dispatch of a substitute vehicle requested by the service executor 7d to the external device CL serving as the center via the out-vehicle communicator 3. If the external device CL receives the information on dispatch of a substitute vehicle, the external device CL dispatches an available vehicle present near the present position of the vehicle V to the present position of the vehicle V as a substitute vehicle, for example.

Subsequently, the service executor 7d controls the in-vehicle display 62, the speaker 63, and other components and causes them to guide the passenger in the inside IN to get off the vehicle V (Step ST508).

Subsequently, the service executor 7d determines whether getting-off of the passenger in the inside IN is completed (Step ST509). The service executor 7d can determine whether getting-off of the passenger in the inside IN is completed based on the image information obtained by the imaging device 51, for example. If the service executor 7d determines that getting-off of the passenger in the inside IN is completed (Yes at Step ST509), the process proceeds to Step ST510. If the service executor 7d determines that getting-off of the passenger in the inside IN is not completed yet (No at Step ST509), the service executor 7d performs the processing at Step ST508 and the processing subsequent thereto again.

At Step ST510, the service executor 7d causes the vehicle V to return to a maintenance station or the like managed by the service provider (Step ST510) and then ends the processing for handling a remaining object. In this case, the service executor 7d controls the traveling system actuator 111 by the ECU 100 and causes the vehicle V to automatically return to the maintenance station or the like. The service provider takes necessary measures, such as cleaning, on the vehicle V caused to return to the maintenance station or the like.

At Step ST511, the image recognizer 7b determines whether the remaining object in the inside IN is an object left behind by a passenger (Step ST511). The image recognizer 7b can determine whether the remaining object in the inside IN is an object left behind by a passenger based on the image information obtained by the imaging device 51, for example. Alternatively, the image recognizer 7b may determine whether the remaining object in the inside IN is an object left behind by a passenger based on information input by the operator who checks the detail of the event at Step ST502 via the external device CL, the out-vehicle communicator 3, and other components. If the image recognizer 7b determines that the remaining object in the inside IN is an object left behind by a passenger (Yes at Step ST511), the process proceeds to Step ST512. If the image recognizer 7b determines that the remaining object in the inside IN is not an object left behind by a passenger (No at Step ST511), the image recognizer 7b determines that the remaining object is neither waste nor an object left behind by a passenger and then ends the processing for handling a remaining object. In this case, the information processor 7a, for example, may control the out-vehicle communicator 3 and transmit the information indicating that the remaining object is neither waste nor an object left behind by a passenger to the external device CL via the out-vehicle communicator 3.

At Step ST512, the service executor 7d determines whether the owner of the object left behind can be identified (Step ST512). The service executor 7d can determine whether the owner of the object left behind can be identified based on the image information obtained by the imaging device 51 and user information registered in reservation of the vehicle V, for example. If the service executor 7d determines that the owner of the object left behind can be identified (Yes at Step ST512), the process proceeds to Step ST513. If the service executor 7d determines that the owner of the object left behind fails to be identified (No at Step ST512), the process proceeds to Step ST514.

At Step ST513, the service executor 7d notifies the owner of the object left behind identified at Step ST512 that the object left behind is present (Step ST513), and the process proceeds to Step ST514. In this case, the information processor 7a, for example, controls the out-vehicle communicator 3 and transmits notification information indicating that the object left behind is present to a mobile terminal possessed by the identified owner of the object left behind via the out-vehicle communicator 3. An address of the mobile terminal possessed by the user (owner) of the vehicle V, for example, is registered in advance in the external device CL in reservation of the vehicle V. The notification information indicating that the object left behind is present may be transmitted from the external device CL to the mobile terminal possessed by the identified owner of the object left behind, for example. The owner who receives the notification information indicating that the object left behind is present through the mobile terminal may register a delivery place for the object left behind in the external device CL via the mobile terminal, for example.

At Step ST514, the service executor 7d determines whether all the passengers in the inside IN get off the vehicle V (Step ST514). The service executor 7d can determine whether all the passengers in the inside IN get off the vehicle V based on the image information obtained by the imaging device 51, for example. If the service executor 7d determines that all the passengers in the inside IN get off the vehicle V (Yes at Step ST514), the process proceeds to Step ST515. If the service executor 7d determines that all the passengers in the inside IN do not get off the vehicle V (No at Step ST514), the service executor 7d performs the processing at Step ST514 again.

At Step ST515, the service executor 7d determines whether a delivery place for the object left behind is fixed (Step ST515). In this case, the information processor 7a, for example, controls the out-vehicle communicator 3 and receives information on a delivery place for the object left behind from the external device CL via the out-vehicle communicator 3. If the information on a delivery place for the object left behind is received, the service executor 7d determines that the delivery place for the object left behind is fixed (Yes at Step ST515), and the process proceeds to Step ST516. If the information on a delivery place for the object left behind is not received, the service executor 7d determines that the delivery place for the object left behind is not fixed (No at Step ST515), and the process proceeds to Step ST510.

At Step ST516, the service executor 7d causes the vehicle V to move to the delivery place based on the information on the delivery place for the object left behind (Step ST516) and then ends the processing for handling a remaining object. In this case, the service executor 7d controls the traveling system actuator 111 by the ECU 100 and causes the vehicle V to automatically move to the delivery place for the object left behind, thereby delivering the object left behind to the owner.

Figure 7:
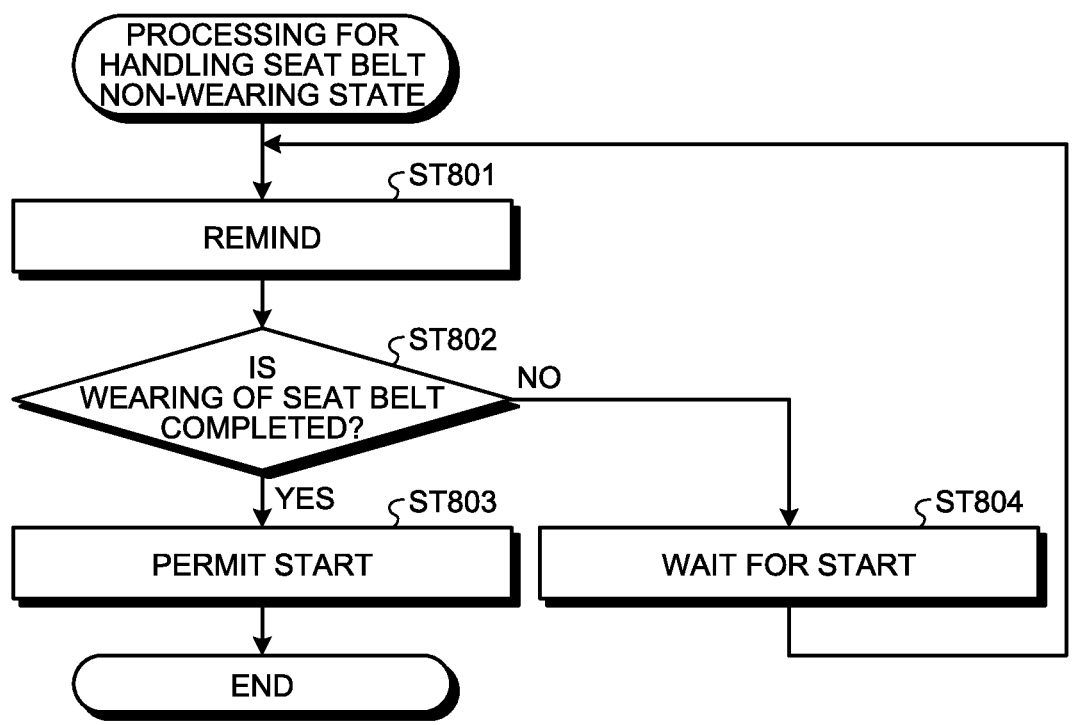
FIG. 7 is a flowchart of an example of processing for handling a seat belt non-wearing state performed by the in-vehicle monitoring module according to the embodiment.

The following describes an outline of an example of the processing for handling a seat belt non-wearing state with reference to the flowchart in FIG. 7.

In the processing for handling a seat belt non-wearing state, the service executor 7d controls the in-vehicle display 62, the speaker 63, and other components and causes them to remind passengers in the inside IN to wear seat belts (Step ST801).

Subsequently, the service executor 7d determines whether wearing of the seat belts by the passengers in the inside IN is completed (Step ST802). The service executor 7d can determine whether wearing of the seat belts by the passengers in the inside IN is completed based on the image information obtained by the imaging device 51, for example. If the service executor 7d determines that wearing of the seat belts by the passengers in the inside IN is completed (Yes at Step ST802), the process proceeds to Step ST803. If the service executor 7d determines that wearing of the seat belts by the passengers in the inside IN is not completed yet (No at Step ST802), the process proceeds to Step ST804.

At Step ST803, the service executor 7d permits the start of the vehicle V (Step ST803) and then ends the processing for handling a seat belt non-wearing state.

At Step ST804, the service executor 7d does not permit the start of the vehicle V and causes the vehicle V to wait (Step ST804) and performs the processing at Step ST801 and the processing subsequent thereto again.

Figure 8:
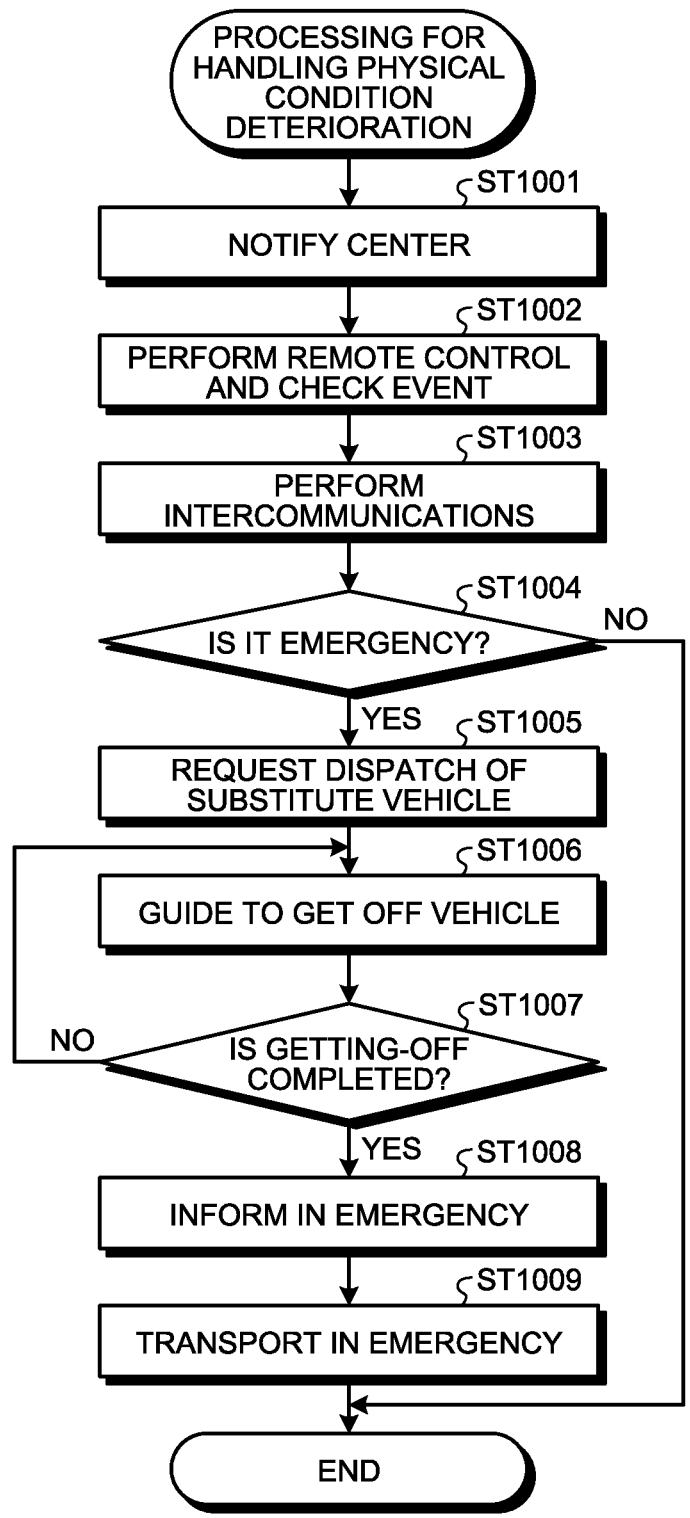
FIG. 8 is a flowchart of an example of processing for handling physical condition deterioration performed by the in-vehicle monitoring module according to the embodiment.

The following describes an outline of an example of the processing for handling physical condition deterioration with reference to the flowchart in FIG. 8.

In the processing for handling physical condition deterioration, the information processor 7a controls the out-vehicle communicator 3 and transmits the occurring event type information on the type of an event determined by the image recognizer 7b to the external device CL via the out-vehicle communicator 3. In this processing, the information processor 7a transmits the occurring event type information indicating physical condition deterioration of a person in the inside IN to the external device CL. As a result, the information processor 7a notifies the external device CL, which is the center, of physical condition deterioration of a person in the inside IN of the vehicle V (Step ST1001).

Subsequently, similarly to the processing at Step ST502, the information processor 7a controls the out-vehicle communicator 3 and receives the remote control information from the external device CL via the out-vehicle communicator 3. As a result, the information processor 7a controls the detector 5 based on the remote control information received from the external device CL via the out-vehicle communicator 3 and remotely controls the detector 5 based on instructions from the external device CL. The information processor 7a controls the out-vehicle communicator 3 and transmits the inside condition information detected by the detector 5 to the external device CL via the out-vehicle communicator 3. As a result, the operator can check the detail of the event occurring in the inside IN of the vehicle V, for example (Step ST1002).

Subsequently, similarly to the processing at Step ST505, the information processor 7a controls the out-vehicle communicator 3 and performs intercommunications with the external device CL via the out-vehicle communicator 3 (Step ST1003). In this case, the service executor 7d turns on the in-vehicle display 62, the speaker 63, the microphone 64, and other components serving as the service operator 6 and enables them to perform intercommunications with the information processor 7a. As a result, the service executor 7d, for example, enables intercommunications between the passenger in the inside IN and the operator on the external device CL side and enables them to communicate with each other.

Subsequently, the service executor 7d determines whether it is an emergency (Step ST1004). The service executor 7d can determine whether the physical condition deterioration of a person in the inside IN is an emergency based on the image information obtained by the imaging device 51, for example. Alternatively, the service executor 7d may determine whether the physical condition deterioration of a person in the inside IN is an emergency based on information input by the operator who checks the detail of the event at Step ST1002 or the operator who performs intercommunications at Step ST1003 via the external device CL, the out-vehicle communicator 3, and other components. If the service executor 7d determines that it is an emergency (Yes at Step ST1004), the process proceeds to Step ST1005. If the service executor 7*d* determines that it is not an emergency (No at Step ST1004), the service executor 7*d* ends the processing for handling physical condition deterioration.

At Step ST1005, similarly to the processing at Step ST507, the service executor 7*d* requests dispatch of a substitute vehicle (Step ST1005).

Subsequently, similarly to the processing at Step ST508, the service executor 7*d* controls the in-vehicle display 62, the speaker 63, and other components and causes them to guide passengers in the inside IN other than the person having the deteriorated physical condition to get off the vehicle V (Step ST1006).

Subsequently, similarly to the processing at Step ST509, the service executor 7*d* determines whether getting-off of the passengers in the inside IN other than the person having the deteriorated physical condition is completed (Step ST1007). If the service executor 7*d* determines that getting-off of the passengers in the inside IN other than the person having the deteriorated physical condition is completed (Yes at Step ST1007), the process proceeds to Step ST1008. If the service executor 7*d* determines that getting-off of the passengers in the inside IN other than the person having the deteriorated physical condition is not completed yet (No at Step ST1007), the service executor 7*d* performs the processing at Step ST1006 and the processing subsequent thereto again.

At Step ST1008, the service executor 7*d* controls the rotating light 65 and causes the rotating light 65 to inform the outside OU of the vehicle V that the vehicle V is traveling in emergency (Step ST1008). In this case, the service executor 7*d* may control the out-vehicle display 61 and other components and cause them to display the notice that the vehicle V is traveling in emergency to the outside OU of the vehicle V.

Subsequently, the service executor 7*d* causes the vehicle V to travel to a hospital or the like as an emergency vehicle (Step ST1009) and then ends the processing for handling physical condition deterioration. In this case, the service executor 7*d* controls the traveling system actuator 111 by the ECU 100 and causes the vehicle V to automatically travel to the hospital or the like with the person having the deteriorated physical condition accommodated therein.

While the control device 7 performs, as the processing for handling physical condition deterioration, the processing of causing the vehicle V to travel to the hospital or the like as an emergency vehicle in the description above, the present embodiment is not limited thereto. Alternatively, the control device 7 may perform processing of notifying the fire department and requesting an emergency vehicle to the area near the vehicle V, for example.

Figure 9:
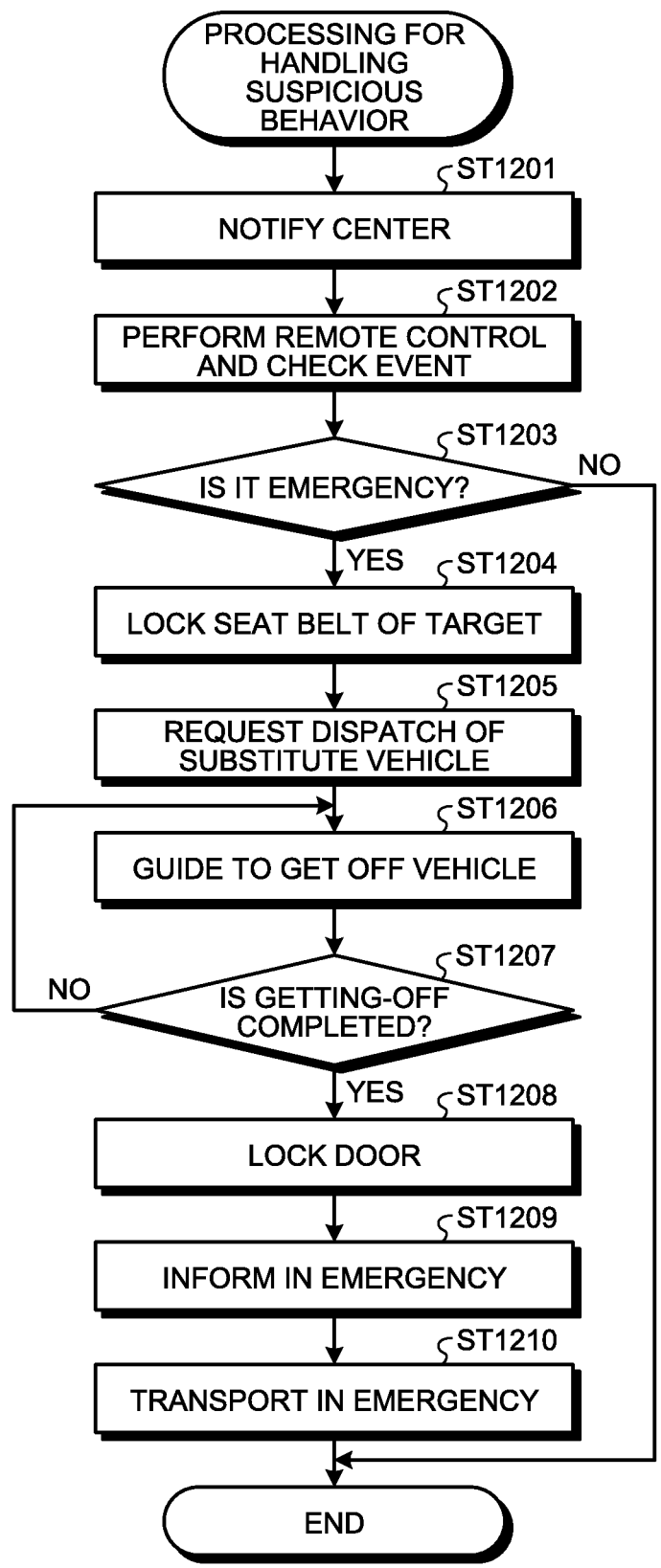
FIG. 9 is a flowchart of an example of processing for handling a suspicious behavior performed by the in-vehicle monitoring module according to the embodiment.

The following describes an outline of an example of the processing for handling a suspicious behavior with reference to the flowchart in FIG. 9.

In the processing for handling a suspicious behavior, the information processor 7*a* controls the out-vehicle communicator 3 and transmits the occurring event type information on the type of an event determined by the image recognizer 7*b* to the external device CL via the out-vehicle communicator 3. In this processing, the information processor 7*a* transmits the occurring event type information indicating a suspicious behavior of a person in the inside IN to the external device CL. As a result, the information processor 7*a* notifies the external device CL, which is the center, of a suspicious behavior of a person in the inside IN of the vehicle V (Step ST1201).

Subsequently, similarly to the processing at Step ST502, the information processor 7*a* controls the out-vehicle communicator 3 and receives the remote control information from the external device CL via the out-vehicle communicator 3. As a result, the information processor 7*a* controls the detector 5 based on the remote control information received from the external device CL via the out-vehicle communicator 3 and remotely controls the detector 5 based on instructions from the external device CL. The information processor 7*a* controls the out-vehicle communicator 3 and transmits the inside condition information detected by the detector 5 to the external device CL via the out-vehicle communicator 3. As a result, the operator can check the detail of the event occurring in the inside IN of the vehicle V, for example (Step ST1202).

Subsequently, the service executor 7*d* determines whether it is an emergency (Step ST1203). The service executor 7*d* can determine whether the suspicious behavior of a person in the inside IN is an emergency based on the image information obtained by the imaging device 51, for example. Alternatively, the service executor 7*d* may determine whether the suspicious behavior of a person in the inside IN is an emergency based on information input by the operator who checks the detail of the event at Step ST1202 via the external device CL, the out-vehicle communicator 3, and other components. If the service executor 7*d* determines that it is an emergency (Yes at Step ST1203), the process proceeds to Step ST1204. If the service executor 7*d* determines that it is not an emergency (No at Step ST1203), the service executor 7*d* ends the processing for handling a suspicious behavior.

At Step ST1204, the service executor 7*d* locks the seat belt of a target who performs the suspicious behavior (Step ST1204). In this case, the service executor 7*d* controls the seat belt device 112 by the ECU 100 and causes the seat belt device 112 to lock the seat belt of the target who performs the suspicious behavior.

Subsequently, similarly to the processing at Step ST507, the service executor 7*d* requests dispatch of a substitute vehicle (Step ST1205).

Subsequently, similarly to the processing at Step ST508, the service executor 7*d* controls the in-vehicle display 62, the speaker 63, and other components and causes them to guide passengers in the inside IN other than the target who performs the suspicious behavior to get off the vehicle V (Step ST1206).

Subsequently, similarly to the processing at Step ST509, the service executor 7*d* determines whether getting-off of the passengers in the inside IN other than the target who performs the suspicious behavior is completed (Step ST1207). If the service executor 7*d* determines that getting-off of the passengers in the inside IN other than the target who performs the suspicious behavior is completed (Yes at Step ST1207), the process proceeds to Step ST1208. If the service executor 7*d* determines that getting-off of the passengers in the inside IN other than the target who performs the suspicious behavior is not completed yet (No at Step ST1207), the service executor 7*d* performs the processing at Step ST1206 and the processing subsequent thereto again.

At Step ST1208, the service executor 7*d* locks the doors for getting-on/off the vehicle V (Step ST1208). In this case, the service executor 7*d* controls the door device 113 by the ECU 100 and causes the door device 113 to lock the doors for getting-on/off the vehicle V.

Subsequently, the service executor 7*d* controls the rotating light 65 and causes the rotating light 65 to inform the outside OU of the vehicle V that the vehicle V is traveling in emergency (Step ST1209). In this case, the service executor 7*d* may control the out-vehicle display 61 and other components and cause them to display the notice that the vehicle V is traveling in emergency to the outside OU of the vehicle V.

Subsequently, the service executor 7*d* causes the vehicle V to travel to a police station or the like as a police vehicle (Step ST1210) and then ends the processing for handling a suspicious behavior. In this case, the service executor 7*d* controls the traveling system actuator 111 by the ECU 100 and causes the vehicle V to automatically travel to the police station or the like with the target who performs the suspicious behavior accommodated therein.

While the control device 7 performs, as the processing for handling a suspicious behavior, the processing of causing the vehicle V to travel to the police station or the like as a police vehicle in the description above, the present embodiment is not limited thereto. Alternatively, the control device 7 may perform processing of notifying the police and requesting a police vehicle to the area near the vehicle V, for example.

Figure 10:
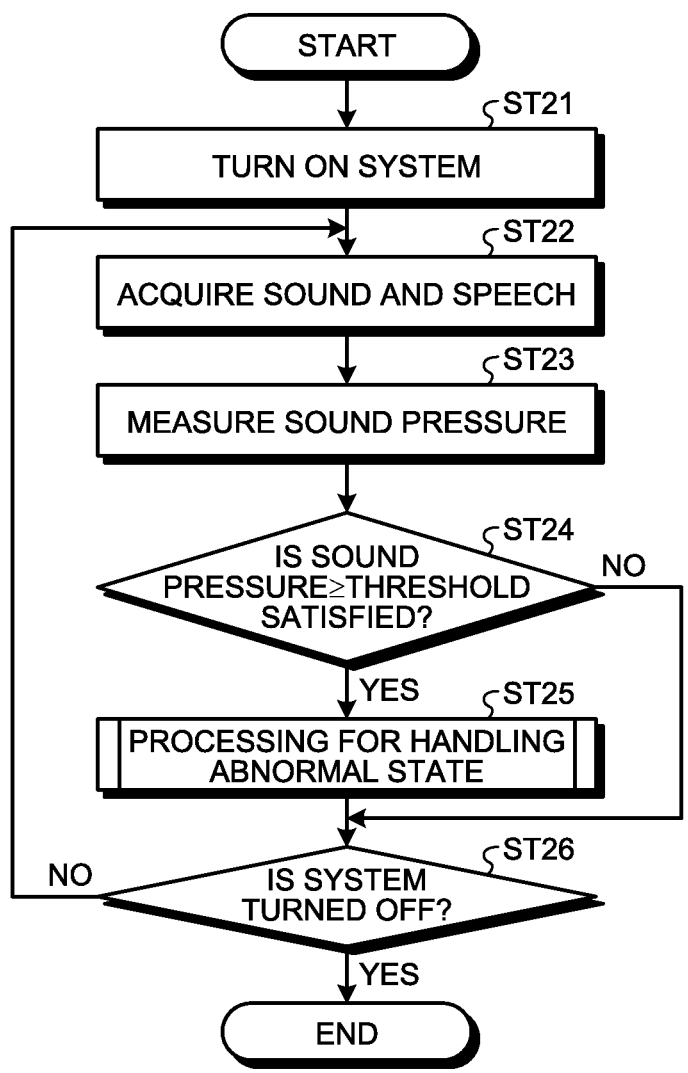
FIG. 10 is a flowchart of another example of control performed by the in-vehicle monitoring module according to the embodiment.

The following describes an outline of another example of control performed by the in-vehicle monitoring module 1 with reference to the flowchart in FIG. 10. Subsequently, the following describes a specific example of the processing for handling an abnormal state with reference to FIG. 11. The control described with reference to FIG. 10 is typically performed in parallel with the control described with reference to FIG. 5.

If the ignition of the vehicle V is turned on, for example, the control device 7 turns on the system implemented by the in-vehicle monitoring module 1 (Step ST21).

Subsequently, the information processor 7*a* of the control device 7 controls the sound pressure sensor 53 and causes the sound pressure sensor 53 to detect sound and speech in the inside IN of the vehicle V and detect the inside condition information. The information processor 7*a* acquires the inside condition information including the sound information of the inside IN (Step ST22).

Subsequently, the speech dialog processor 7*c* of the control device 7 measures the sound pressure of the sound information indicating sound and speech in the inside IN of the vehicle V included in the inside condition information acquired at Step ST22 (Step ST23).

Subsequently, the speech dialog processor 7*c* determines the type of an event occurring in the inside IN of the vehicle V based on the sound pressure measured at Step ST23. The image recognizer 7*b* determines whether the sound pressure measured at Step ST23 is equal to or higher than a predetermined threshold (Step ST24).

If the speech dialog processor 7*c* determines that the sound pressure is equal to or higher than the predetermined threshold (Yes at Step ST24), the speech dialog processor 7*c* determines an abnormal state in the inside IN as the type of an event occurring in the inside IN of the vehicle V, and the process proceeds to Step ST25. At Step ST25, the service executor 7*d* of the control device 7 performs the processing for handling an abnormal state (Step ST25), and the process proceeds to Step ST26. If the speech dialog processor 7*c* determines that the sound pressure is lower than the predetermined threshold (No at Step ST24), the process skips the processing for handling an abnormal state at Step ST25 and proceeds to Step ST26.

At Step ST26, the control device 7 determines whether the system implemented by the in-vehicle monitoring module 1 is turned off in response to turning-off of the ignition of the vehicle V, for example (Step ST26). If the control device 7 determines that the system is not turned off (No at Step ST26), the control device 7 performs the processing at Step ST22 and the processing subsequent thereto again. If the control device 7 determines that the system is turned off (Yes at Step ST26), the control device 7 ends this control.

The following describes an outline of an example of the processing for handling an abnormal state with reference to the flowchart in FIG. 11.

In the processing for handling an abnormal state, the information processor 7*a* controls the out-vehicle communicator 3 and transmits the occurring event type information on the type of an event determined by the speech dialog processor 7*c* to the external device CL via the out-vehicle communicator 3. In this processing, the information processor 7*a* transmits the occurring event type information indicating an abnormal state in the inside IN to the external device CL. As a result, the information processor 7*a* notifies the external device CL, which is the center, of an abnormal state in the inside IN of the vehicle V (Step ST2501).

Subsequently, similarly to the processing at Step ST502, the information processor 7*a* controls the out-vehicle communicator 3 and receives the remote control information from the external device CL via the out-vehicle communicator 3. As a result, the information processor 7*a* controls the detector 5 based on the remote control information received from the external device CL via the out-vehicle communicator 3 and remotely controls the detector 5 based on instructions from the external device CL. The information processor 7*a* controls the out-vehicle communicator 3 and transmits the inside condition information detected by the detector 5 to the external device CL via the out-vehicle communicator 3. As a result, the operator can check the detail of the event occurring in the inside IN of the vehicle V, for example (Step ST2502).

Subsequently, similarly to the processing at Step ST504, the image recognizer 7*b* determines whether a passenger is present in the inside IN of the vehicle V (whether there is a passenger) (Step ST2503). If the image recognizer 7*b* determines that a passenger is present in the inside IN of the vehicle V (Yes at Step ST2503), the process proceeds to Step ST2504. If the image recognizer 7*b* determines that no passenger is present in the inside IN of the vehicle V (No at Step ST2503), the process skips Step ST2504 and proceeds to Step ST2505.

At Step ST2504, similarly to the processing at Step ST505, the information processor 7*a* controls the out-vehicle communicator 3 and performs intercommunications with the external device CL via the out-vehicle communicator 3 (Step ST2504). The process then proceeds to Step ST2505. In this case, the service executor 7*d* turns on the in-vehicle display 62, the speaker 63, the microphone 64, and other components serving as the service operator 6 and enables them to perform intercommunications with the information processor 7*a*. As a result, the service executor 7*d*, for example, enables intercommunications between the passenger in the inside IN and the operator on the external device CL side and enables them to communicate with each other.

At Step ST2505, similarly to the processing at Step ST1004, the service executor 7*d* determines whether it is an emergency (Step ST2505). The service executor 7*d* can determine whether the abnormal state in the inside IN is an emergency based on the image information obtained by the imaging device 51, for example. Alternatively, the service executor 7*d* may determine whether the abnormal state in the inside IN is an emergency based on information input by the operator who checks the detail of the event at Step ST2502 or the operator who performs intercommunications at Step ST2504 via the external device CL, the out-vehicle communicator 3, and other components. If the service executor 7d determines that it is an emergency (Yes at Step ST2505), the process proceeds to Step ST2506. If the service executor 7d determines that it is not an emergency (No at Step ST2505), the service executor 7d skips the processing at Step ST2506 and then ends the processing for handling an abnormal state.

At Step ST2506, the service executor 7d dispatches a police vehicle, an emergency vehicle, or the like to the area near the vehicle V or causes the vehicle V to return to the maintenance station or the like managed by the service provider (Step ST2506) and then ends the processing for handling an abnormal state. In this case, the service executor 7d may control the traveling system actuator 111 by the ECU 100 and causes the vehicle V to automatically return to the maintenance station or the like. The service provider may take necessary measures on the vehicle V caused to return to the maintenance station or the like.

As described above, in the in-vehicle monitoring module 1 and the monitoring system 500, the control device 7 determines the type of an event occurring in the inside IN of the vehicle V based on the conditions in the inside IN of the vehicle V detected by the detector 5. The in-vehicle monitoring module 1 performs processing of controlling the service operator 6 based on the type of an event determined by the control device 7 and causing the service operator 6 to perform an operation corresponding to the type of the event. The in-vehicle monitoring module 1 with this configuration includes the detector 5, the service operator 6, the control device 7, and other components fixed to the housing 2 to serve as a unit. The in-vehicle monitoring module 1 is provided at the upper part of the inside IN of the vehicle V, that is, on the roof member RF in this example. With this configuration, the in-vehicle monitoring module 1 with its main part serving as a unit is disposed on the roof member RF of the vehicle V. Consequently, the in-vehicle monitoring module 1 can intensively monitor the inside IN of the vehicle V from the roof member RF side at the upper part of the inside IN. As a result, the in-vehicle monitoring module 1 can appropriately monitor the inside IN of the vehicle V. If the in-vehicle monitoring module 1 is used for the vehicle V capable of full-automatic driving with no driver present in the vehicle V, for example, the in-vehicle monitoring module 1 can monitor the inside IN of the vehicle V and perform various kinds of processing depending on the conditions in place of a driver. As a result, the in-vehicle monitoring module 1 can operate the vehicle V safely, reliably, and comfortably as if a driver is in the vehicle V, for example.

In the in-vehicle monitoring module 1 and the monitoring system 500, the control device 7 can determine the type of an event occurring in the inside IN of the vehicle V based on an image of the inside IN of the vehicle V taken by the imaging device 51 included in the detector 5. As a result, the in-vehicle monitoring module 1 can appropriately monitor the inside IN of the vehicle V based on the image of the inside IN of the vehicle V.

In the in-vehicle monitoring module 1 and the monitoring system 500, the control device 7 can determine the type of an event occurring in the inside IN of the vehicle V based on sound in the inside IN of the vehicle V detected by the sound pressure sensor 53 included in the detector 5. As a result, the in-vehicle monitoring module 1 can appropriately monitor the inside IN of the vehicle V based on the sound in the inside IN of the vehicle V.

In the in-vehicle monitoring module 1 and the monitoring system 500, the control device 7 controls the out-vehicle communicator 3 and transmits the information on the determined type of an event to the external device CL via the out-vehicle communicator 3. With this configuration, the in-vehicle monitoring module 1 can receive various cloud services from the external device CL and cause the service operator 6 to perform an operation corresponding to the type of an event occurring in the inside IN. Furthermore, the in-vehicle monitoring module 1 can operate the vehicle V such that the operator or other staff members of the service provider that manages the external device CL simply needs to handle an event when necessary depending on the type of the event occurring in the inside IN without always monitoring the inside IN of the vehicle V. As a result, the in-vehicle monitoring module 1 can improve the business efficiency of the service provider that manages the external device CL, for example.

More specifically, in the in-vehicle monitoring module 1 and the monitoring system 500, the control device 7 can control the in-vehicle display 62 and the speaker 63 and cause them to output the output information received from the external device CL via the out-vehicle communicator 3. With this configuration, the in-vehicle monitoring module 1 can output various kinds of information input by the operator or other staff members of the service provider that manages the external device CL to the inside IN of the vehicle V via the in-vehicle display 62 and the speaker 63. As a result, the in-vehicle monitoring module 1 can perform more careful handling depending on the type of an event occurring in the inside IN.

In the in-vehicle monitoring module 1 and the monitoring system 500, the control device 7 can control the detector 5 based on the remote control information received from the external device CL via the out-vehicle communicator 3 and remotely control the detector 5. In addition, in the in-vehicle monitoring module 1, the control device 7 can transmit the inside condition information on the conditions in the inside IN of the vehicle V detected by the detector 5 to the external device CL via the out-vehicle communicator 3. Also in this point, the in-vehicle monitoring module 1 can perform more careful handling depending on the type of an event occurring in the inside IN.

In the in-vehicle monitoring module 1 and the monitoring system 500, the control device 7 can control the on-board devices 101 provided outside the housing 2 via the in-vehicle communicator 4 and cause the on-board devices 101 to perform an operation corresponding to the type of an event occurring in the inside IN. As a result, the in-vehicle monitoring module 1 can perform more careful handling depending on the type of an event occurring in the inside IN together with the traveling system actuator 111, the seat belt device 112, and the door device 113 serving as the on-board devices 101 of the vehicle V, for example.

The in-vehicle monitoring module 1 and the monitoring system 500 can distinguish and determine the presence of a remaining object in the inside IN, a seat belt non-wearing state of a person in the inside IN, physical condition deterioration of a person in the inside IN, a suspicious behavior of a person in the inside IN, and an abnormal state in the inside IN, for example. The in-vehicle monitoring module 1 can cause the service operator 6 to perform respective operations corresponding to the presence of a remaining object in the inside IN, a seat belt non-wearing state of a person in the inside IN, physical condition deterioration of a person in the inside IN, a suspicious behavior of a person in the inside IN, and an abnormal state in the inside IN.

The in-vehicle monitoring module according to an embodiment of the present invention is not limited to the in-vehicle monitoring module 1 according to the embodiment above, and various changes may be made within the scope of the claims.

While the vehicle V is a vehicle, such as a bus, a taxi, and a ride-sharing car, managed by a specific service provider and capable of full-automatic driving in the description above, for example, the vehicle V is not limited thereto. The vehicle V, for example, may be a vehicle capable of manual driving of controlling the behavior of the vehicle V depending on driving operations performed by a driver of the vehicle V.

While the in-vehicle monitoring module 1 includes the out-vehicle communicator 3, the in-vehicle communicator 4, the detector 5, the service operator 6, and the control device 7 fixed to the housing 2 to serve as a unit in the description above, the present embodiment is not limited thereto. In the in-vehicle monitoring module 1, for example, the out-vehicle communicator 3 and the in-vehicle communicator 4 may be separated from the housing 2 and connected to the control device 7 in a communicable manner. The in-vehicle monitoring module 1 does not necessarily include the out-vehicle communicator 3 or the in-vehicle communicator 4. In the in-vehicle monitoring module 1, at least one of the imaging device 51, the radar/sonar 52, and the sound pressure sensor 53 serving as the detector 5 simply needs to be fixed to the housing 2. In other words, part of the detector 5 may be separated from the housing 2 and connected to the control device 7 in a communicable manner. Similarly, in the in-vehicle monitoring module 1, at least one of the out-vehicle display 61, the in-vehicle display 62, the speaker 63, the microphone 64, and the rotating light 65 serving as the service operator 6 simply needs to be fixed to the housing 2. In other words, part of the service operator 6 may be separated from the housing 2 and connected to the control device 7 in a communicable manner. The speaker 63 and the microphone 64 may be provided to a headrest, for example.

While the housing 2 is provided on the roof member RF of the vehicle V in the description above, the present embodiment is not limited thereto. The housing 2 may be provided on a side wall member of the inside IN near the roof member RF as long as it is provided at the upper part of the inside IN.

While the detector 5 illustrated in FIG. 1 includes the imaging device 51, the radar/sonar 52, and the sound pressure sensor 53 in the description above, the present embodiment is not limited thereto. The detector 5 may include another detector besides the imaging device 51, the radar/sonar 52, and the sound pressure sensor 53. The microphone 64, for example, may be shared as a sound detecting device of the detector 5. In this case, the detector 5 may include both of the microphone 64 and the sound pressure sensor 53 or only the microphone 64 as the sound detecting device. The service operator 6, for example, is not limited to the out-vehicle display 61, the in-vehicle display 62, the speaker 63, the microphone 64, and the rotating light 65 as described above. The service operator 6 may include a tactile information output device that outputs seat vibrations, for example, as an information output device. The service operator 6 may include another operator besides the information output device.

While the image recognizer 7b of the control device 7 determines the type of an event occurring in the inside IN of the vehicle V based on an image of the inside IN of the vehicle V taken by the imaging device 51, the present embodiment is not limited thereto. While the speech dialog processor 7c of the control device 7 determines the type of an event occurring in the inside IN of the vehicle V based on sound in the inside IN of the vehicle V detected by the sound pressure sensor 53, the present embodiment is not limited thereto. The control device 7 may determine the type of an event occurring in the inside IN of the vehicle V based on the inside condition information detected by the radar/sonar 52 or other detectors, for example. The control device 7 may determine the type of an event occurring in the inside IN of the vehicle V based on the inside condition information, such as vibrations in the inside IN, a smell in the inside IN, a gas (e.g., a poisonous gas and cigarette smoke) in the inside IN, and heat in the inside IN, for example, besides the image of the inside IN and the sound in the inside IN. While the control device 7 determines the presence of a remaining object in the inside IN, a seat belt non-wearing state of a person in the inside IN, physical condition deterioration of a person in the inside IN, a suspicious behavior of a person in the inside IN, or an abnormal state in the inside IN as the type of an event in the description above, the present embodiment is not limited thereto. The contents of the processing for handling a remaining object, a seat belt non-wearing state, physical condition deterioration, a suspicious behavior, and abnormal state are not limited to those described above.

While the speech dialog processor 7c determines an abnormal state in the inside IN when the sound pressure of the sound in the inside IN of the vehicle V detected by the sound pressure sensor 53 is equal to or higher than a predetermined threshold in the description above, the present embodiment is not limited thereto. Similarly to the image recognizer 7b, the speech dialog processor 7c may determine the type of an event occurring in the inside IN of the vehicle V using various known artificial intelligence techniques. The speech dialog processor 7c, for example, may determine the type of an event occurring in the inside IN of the vehicle V based on the inside condition information detected by the detector 5 and the event type determination information stored in the storage unit 7B. In this case, the speech dialog processor 7c may determine an abnormal state in the inside IN when recognizing specific words, such as "kill" and "stop it", based on the sound information collected by a sound collecting microphone (e.g., the microphone 64) serving as the sound detecting device, for example.

The inside condition information detected by the detector 5 (the imaging device 51, the radar/sonar 52, and the sound pressure sensor 53) may be recorded and stored in a recording device, such as the storage unit 7B and a drive recorder. In this case, the in-vehicle monitoring module 1 may notify the passengers that the inside condition information is recorded and stored.

While the control device 7 causes the service operator 6 to perform an operation corresponding to the type of an event in cooperation with the external device CL in the description above, the present embodiment is not limited thereto. The control device 7 may cause the service operator 6 to perform an operation corresponding to the type of an event independently in the in-vehicle monitoring module 1 without cooperating with the external device CL.

The control described with reference to FIG. 10 may be incorporated in the control described with reference to FIG. 5.

The units of the control device 7 described above may be separated, and the control device 7 may be provided by connecting the units in a manner capable of transmitting and receiving various electrical signals to and from each other. Furthermore, part of the functions of the control device 7 may be implemented by other control devices. The speech dialog processor 7c, for example, may be provided in the external device CL side. The speech dialog processor 7c, for example, may simulatively serve as the operator of the service provider that manages the external device CL using various known artificial intelligence techniques. The computer programs, the applications, and the various data described above may be appropriately updated or stored in a server (e.g., the external device CL) connected to the in-vehicle monitoring module 1 via a desired network, for example. All or part of the computer programs, the applications, and the various data described above may be downloaded as necessary, for example. All or desired part of the processing functions included in the control device 7 may be provided as a CPU or a computer program interpreted and executed by the CPU or as hardware by wired logic, for example.

In the in-vehicle monitoring module and the monitoring system according to the present embodiment, the control device determines the type of an event occurring in the inside of the vehicle based on the condition in the inside of the vehicle detected by the detector. In the in-vehicle monitoring module, the control device performs the processing of controlling the service operator based on the determined type of the event and causing the service operator to perform an operation corresponding to the type of the event. The in-vehicle monitoring module with this configuration includes the detector, the service operator, and the control device fixed to the housing to serve as a unit and is provided at the upper part of the inside of the vehicle. As a result, the in-vehicle monitoring module can appropriately monitor the inside of the vehicle.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An in-vehicle monitoring module comprising:
a detector that detects a condition in an inside of a vehicle;
a service operator that is provided to the vehicle;
a controller that is capable of performing processing of determining a type of an event occurring in the inside of the vehicle based on the condition in the inside of the vehicle detected by the detector, controlling the service operator based on the determined type of the event, and causing the service operator to perform an operation corresponding to the type of the event;
a housing that is provided with the detector, the service operator, and the controller to serve as a unit and provided on an interior portion of a roof member of the vehicle; and
an out-vehicle communicator that is capable of performing communications with an external device provided outside and remote to the vehicle, wherein
the controller is capable of performing processing of controlling the out-vehicle communicator and transmitting information on the determined type of the event to the external device via the out-vehicle communicator,
the service operator includes an information output device capable of outputting information to the inside of the vehicle,
the controller is capable of performing processing of controlling the information output device and causing the information output device to output information received from the external device via the out-vehicle communicator, and
wherein the output information received from the external device is generated by the external device in response to the information on the determined type of the event transmitted by the out-vehicle communicator.

2. The in-vehicle monitoring module according to claim 1, wherein
the detector includes an imaging device configured to take an image of the inside of the vehicle, thereby detecting the condition in the inside of the vehicle, and
the controller determines the type of the event occurring in the inside of the vehicle based on the image of the inside of the vehicle taken by the imaging device.

3. The in-vehicle monitoring module according to claim 1, wherein
the detector includes a sound detecting device configured to detect sound in the inside of the vehicle, thereby detecting the condition in the inside of the vehicle, and
the controller determines the type of the event occurring in the inside of the vehicle based on the sound in the inside of the vehicle detected by the sound detecting device.

4. The in-vehicle monitoring module according to claim 2, wherein
the detector includes a sound detecting device configured to detect sound in the inside of the vehicle, thereby detecting the condition in the inside of the vehicle, and
the controller determines the type of the event occurring in the inside of the vehicle based on the sound in the inside of the vehicle detected by the sound detecting device.

5. The in-vehicle monitoring module according to claim 1, wherein
the controller is capable of performing processing of controlling the detector based on information received from the external device via the out-vehicle communicator and remotely controlling the detector and processing of controlling the out-vehicle communicator and transmitting information on the condition in the inside of the vehicle detected by the detector to the external device via the out-vehicle communicator.

6. The in-vehicle monitoring module according to claim 1, further comprising:
an in-vehicle communicator that is capable of performing communications with an on-board device mounted outside the housing of the vehicle, wherein
the controller is capable of performing processing of controlling the on-board device via the in-vehicle communicator based on the determined type of the event and causing the on-board device to perform an operation corresponding to the type of the event.

7. The in-vehicle monitoring module according to claim 2, further comprising:
an in-vehicle communicator that is capable of performing communications with an on-board device mounted outside the housing of the vehicle, wherein
the controller is capable of performing processing of controlling the on-board device via the in-vehicle communicator based on the determined type of the event and causing the on-board device to perform an operation corresponding to the type of the event.

8. The in-vehicle monitoring module according to claim 3, further comprising:

an in-vehicle communicator that is capable of performing communications with an on-board device mounted outside the housing of the vehicle, wherein
the controller is capable of performing processing of controlling the on-board device via the in-vehicle communicator based on the determined type of the event and causing the on-board device to perform an operation corresponding to the type of the event.

9. The in-vehicle monitoring module according to claim 5, further comprising:
an in-vehicle communicator that is capable of performing communications with an on-board device mounted outside the housing of the vehicle, wherein
the controller is capable of performing processing of controlling the on-board device via the in-vehicle communicator based on the determined type of the event and causing the on-board device to perform an operation corresponding to the type of the event.

10. The in-vehicle monitoring module according to claim 1, wherein
the controller determines presence of a remaining object in the inside, a seat belt non-wearing state of a person in the inside, physical condition deterioration of a person in the inside, a suspicious behavior of a person in the inside, or an abnormal state in the inside as the type of the event.

11. A monitoring system comprising:
an in-vehicle monitoring module that is mounted on a vehicle; and
an external device that is provided outside the vehicle and capable of transmitting and receiving information to and from the in-vehicle monitoring module, wherein
the in-vehicle monitoring module comprises:
a detector that detects a condition in an inside of the vehicle;
a service operator that is provided to the vehicle;
a controller that is capable of performing processing of determining a type of an event occurring in the inside of the vehicle based on the condition in the inside of the vehicle detected by the detector, controlling the service operator based on the determined type of the event, and causing the service operator to perform an operation corresponding to the type of the event; and
a housing that is provided with the detector, the service operator, and the controller to serve as a unit and provided on an interior portion of a roof member of the vehicle,
an out-vehicle communicator that is capable of performing communications with an external device provided outside and remote to the vehicle,
the controller performs processing of causing the service operator to perform the operation corresponding to the type of the event in cooperation with the external device,
the controller is capable of performing processing of controlling the out-vehicle communicator and transmitting information on the determined type of the event to the external device via the out-vehicle communicator,
the service operator includes an information output device capable of outputting information to the inside of the vehicle,
the controller is capable of performing processing of controlling the information output device and causing the information output device to output information received from the external device via the out-vehicle communicator, and
wherein the output information received from the external device is generated by the external device in response to the information on the determined type of the event transmitted by the out-vehicle communicator.

12. The in-vehicle monitoring module according to claim 1, wherein
the service operator includes a speaker capable of outputting sound information to the inside of the vehicle, and
the controller is capable of performing processing of causing the information output device to display an image information included in the received output information from the external device for a passenger in the inside of the vehicle, and causing the speaker to output a sound information included in the received output information from the external device for the passenger in the inside of the vehicle.

* * * * *